(12) United States Patent
Herbelin

(10) Patent No.: US 7,039,088 B2
(45) Date of Patent: May 2, 2006

(54) ENHANCEMENT OF CHEMICAL LASERS VIA CONTROL OF THE AMBIENT RADIATION ENVIRONMENT

(75) Inventor: John M. Herbelin, Albuquerque, NM (US)

(73) Assignee: Applied Research Associates, Albuquerque, NM (US)

( * ) Notice: Subject to any disclaimer, the term of this patent is extended or adjusted under 35 U.S.C. 154(b) by 388 days.

(21) Appl. No.: 10/616,232

(22) Filed: Jul. 10, 2003

(65) Prior Publication Data

US 2004/0052287 A1 Mar. 18, 2004

Related U.S. Application Data

(60) Provisional application No. 60/394,662, filed on Jul. 10, 2002.

(51) Int. Cl.
*H01S 3/223* (2006.01)
*H01S 3/095* (2006.01)
*H01S 3/09* (2006.01)

(52) U.S. Cl. ............................. 372/89; 372/55; 372/90; 372/91

(58) Field of Classification Search .................... 372/89
See application file for complete search history.

(56) References Cited

U.S. PATENT DOCUMENTS

| | | | |
|---|---|---|---|
| 4,267,526 A | 5/1981 | McDermott et al. | 372/89 |
| 4,342,116 A | 7/1982 | MacKnight et al. | 372/89 |
| 4,653,062 A | 3/1987 | Davis et al. | 372/89 |
| 4,866,729 A | 9/1989 | Verdier et al. | 372/89 |
| 4,891,815 A | 1/1990 | Ragle et al. | 372/44.01 |
| 4,961,200 A | 10/1990 | Verdier et al. | 372/89 |
| 5,052,011 A | 9/1991 | Piltch et al. | 372/77 |
| 5,148,748 A | 9/1992 | Yarrington | 102/201 |
| 5,212,339 A | 5/1993 | Piltch | 102/202 |
| 5,417,928 A | 5/1995 | McDermott | 422/120 |
| 5,802,095 A | 9/1998 | Schall | 372/89 |
| 5,870,422 A | 2/1999 | Florentino et al. | 372/89 |
| 5,883,916 A | 3/1999 | Lohn et al. | 372/89 |
| 5,974,072 A | 10/1999 | Hartlove et al. | 372/89 |
| 6,154,478 A | 11/2000 | Vetrovec | 372/89 |
| 6,212,989 B1 | 4/2001 | Beyer et al. | 89/17 |
| 6,276,276 B1 | 8/2001 | Erickson | 102/201 |
| 6,377,600 B1 | 4/2002 | Flegal | 372/89 |
| 2001/0033597 A1 | 10/2001 | Neumann | 372/89 |
| 2002/0067753 A1 | 6/2002 | Ullman et al. | 372/89 |

*Primary Examiner*—Armando Rodriguez
(74) *Attorney, Agent, or Firm*—Jacobson Holman PLLC

(57) ABSTRACT

A system and method for obtaining improved performance of chemical laser systems by exercising control over the radiation environments of these devices. Proper control of the AERE is achieved through the control of the wall construction including the choice of materials, placement and contours, the control of the wall temperatures (separately from the gas phase temperature), and the use of optical filters or added radiation sources, to achieve a synergistic optimum performance that demonstrates superior performance characteristics beyond that which could be achieved without the control of the AERE. This control is exercised through the proper application of anti-reflecting coatings for those spectral ranges that need to be mitigated and reflecting coatings for those frequencies that need to be augmented. The determination of these frequencies is made through the application of a novel mathematical model to the kinetic processes of the laser system.

18 Claims, 4 Drawing Sheets

FIG. 1
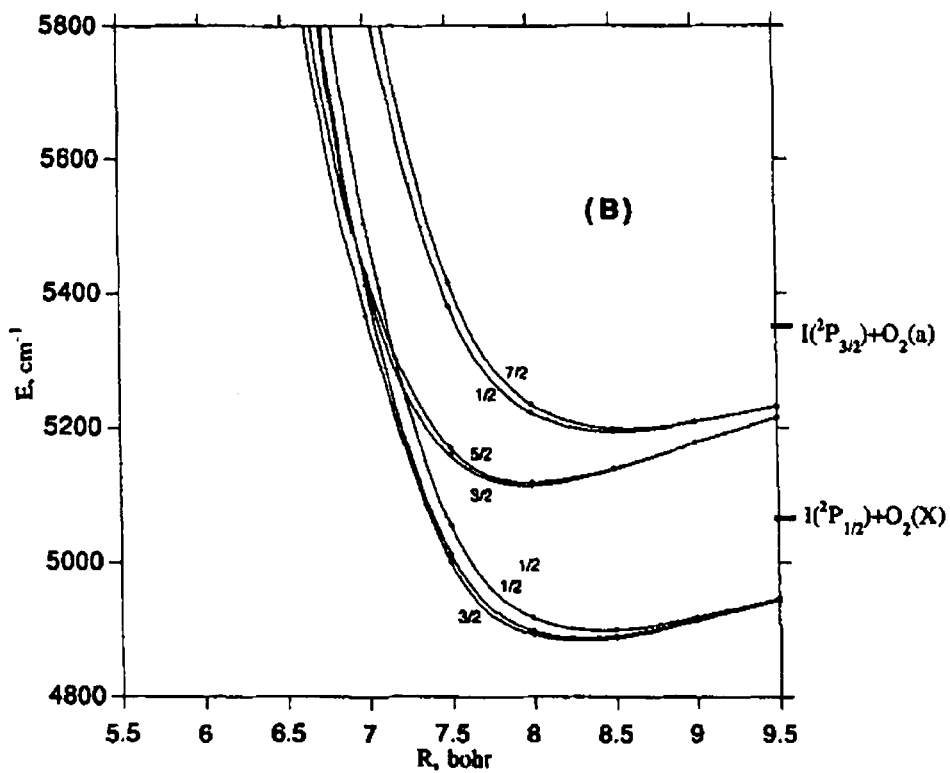
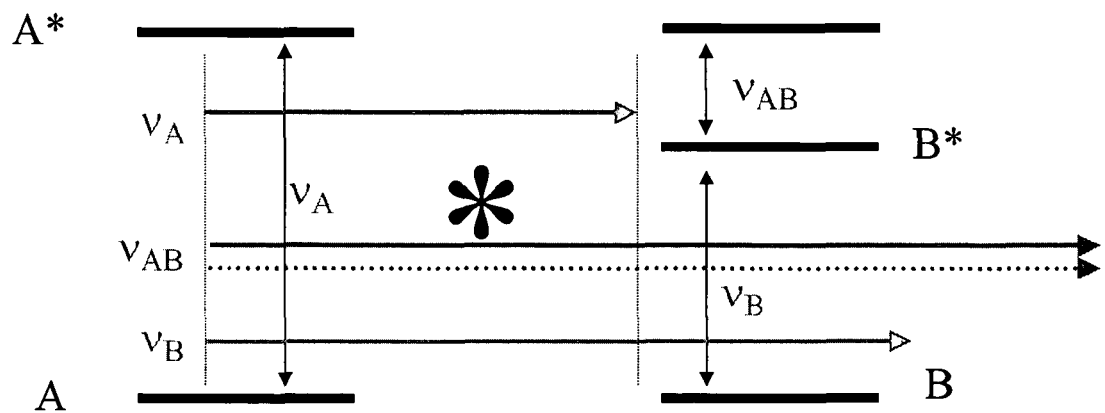
FIG. 2

ENHANCEMENT OF CHEMICAL LASERS VIA CONTROL OF THE AMBIENT RADIATION ENVIRONMENT

This is a complete utility application entitled to the priority and claiming the benefit of U.S. provisional application Ser. No. 60/394,662 filed Jul. 10, 2002.

BACKGROUND OF THE INVENTION

1. Field of the Invention

The present invention is related to the field of chemical lasers and, more particularly, to the achievement of improved performance via the control of the Ambient Electromagnetic Radiation Environment (AERE). By the proper control of the AERE at prescribed frequencies, it is possible to enhance or mitigate specific chemical reaction processes so as to enhance the performance of any gas phase chemical laser beyond the performance level achievable without this control of the AERE.

2. Description of the Related Art

Historically, the ambient radiation environments of the chemical reactions that either generate or destroy the required inversions in energy chemical lasers have been ignored. In fact, the scientific community at this time remains ignorant of the existence and importance of the role that radiation plays in these kinetic processes. Instead, the current state of the art relies on the measurement of the so-called thermal or kinetic temperature of the environment which is related to the velocities of the reactants using classical molecular theory as a means of computing the magnitude of these rate coefficients. Essentially, the prior art has relied on a trial and error experimental approach to achieving improved performance of laser devices and, while some advances have been made, the prior art remains unable to pre-determine the optimum conditions in hardware design and flow conditions to achieve superior performance.

SUMMARY OF THE INVENTION

The present invention is directed to a system and method for controlling the AERE via the proper construction and control of the containment walls for these gaseous chemical lasers. In specific incidents this may include the use of optical filters and/or additional radiation sources to suppress or stimulate radiation as prescribed frequencies. A key aspect of this invention is that the optimized AERE for each laser or component part of the laser can be predetermined and optimized by the judicious application of a mathematical model to the laser system or component parts. This model, which is referred to herein by the acronym POETRY Theory, was developed for the express purpose of determining the dependence of the energy processes upon the AERE. The physical basis of this model will be explained in the following discussions.

As used herein, the AERE consists of the electromagnetic radiation at predetermined specific frequencies ranging from the visible to the far-infrared regions of the spectrum. The precise frequencies can be identified for each process and the degree to which each process is moderated can be determined by the proper application of the mathematical model-described herein and referred to as the POETRY Theory. The acronym stands for Purely Optical Energy Transfer Reaction Yields and the theory is developed, described and applied to numerous reaction systems. The basis of this mathematical model is the premise that all physical processes involving the inter-conversion or intra-conversion of atomic or molecular energy are accompanied by the absorption or emission of a photon of electromagnetic radiation at the frequency corresponding to the resonance mismatch of the conversion process. The general nature of this process can be symbolized by the mathematical equation,

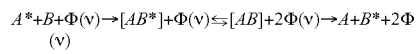

in the exothermic direction and

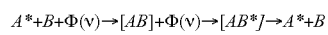

in the endothermic direction.

These processes combine the formation of intermediate species with the simultaneous absorption of a photon at the frequency (v). While the formation of complexes in general and the absorption of photons in general are well known processes, the simultaneity of these two processes provides a unique and new feature of this energy transfer process. Thus, kinetic evidence supporting the conclusion that the absorption of the photon actually stabilizes the formation of the complexes is presented herein.

The rate for either direction is directly proportional to the product of the species concentrations of the reactants and the radiation density, $\Phi(v)$, of the electromagnetic radiation at the frequency, (v).

$$\text{Rate}=k_f(v)[A^*][B]\Phi(v)=k_r(v)[A][B^*]\Phi(v)$$

This frequency is related to the difference between the energy differences of the corresponding states of reactants and products. The rate coefficients $k_f(v)$ and $k_r(v)$ for the forward and reverse processes are also dependent upon this non-resonance frequency (v), which will be defined hereinafter.

In contrast to prior art techniques, POETRY Theory clearly shows that there are separate dependencies upon the standard thermal temperature and upon the radiation densities at these prescribed frequencies. Under a wide variety of conditions these radiation densities can be computed from the thermal temperature using the modified Plank expression for radiation densities of "gray" bodies. However, there are many conditions for which this is not the case and this equilibrium assumption is not valid. It is under these circumstances that the more exact POETRY Theory must be applied. The judicious application of this theory to the particular conditions under investigation usually shows just how to modify the AERE by modification of the container walls, size, geometry, material construction and or temperature so as to achieve optimized performance. All of the basic physics along with examples is discussed in detail in the following sections.

In view of the foregoing, one objective of the present invention is to enhance the output of chemical laser systems through improved control of the Ambient Electromagnetic Radiation Environment (AERE) through the careful selection of laser wall materials, linings, and geometry.

Another objective of the present invention is to improve chemical laser performance via the moderation of the AERE by means of thermal control of the temperature of inner walls of the laser flow apparatus consisting of non-reflective materials at specified frequencies.

A further objective of the present invention is to reduce the amount of chemical reactants that is necessary to produce a given output power performance, i.e., increased laser performance, by means of precise control of the radiation environment at the specified frequencies.

Yet another objective of the present invention is to produce chemical lasers that can operate at increased pressure levels so as to mitigate the pumping requirements and thereby result in increased performance and increased mobility of these laser systems via control of the AERE.

A further objective of the present invention is to remove size scaling limits by means of optically isolating the chemical laser flows so as to moderate the radiation environment at selected frequencies while maintaining optical connection on the desired laser frequencies.

A further objective of the present invention is to reduce the amount of experimentation required to achieve optimum performance of chemical lasers.

A further objective of the present invention is to reduce the amount of labor (both theoretical and experimental) to determine the rate coefficients as a function of the experimental variables, such as temperature. These rate coefficients are critically important requirements for mathematical modeling of these chemical lasers using computational fluid dynamic (CFD) computer codes and can be computed by POETRY Theory at great cost savings.

A further objective of the present invention is to reduce the amount of error that exists in the rate coefficients as a function of the experimental variables. POETRY Theory has been shown to be able to predict the values of these rate coefficients with more accuracy and greater reliability than they can currently be measured for a large number of processes.

BRIEF DESCRIPTION OF THE DRAWINGS

FIG. 1 shows adiabatic energy surfaces for the $O_2$+I complexes.

FIG. 2 is a schematic representation of the energy levels involved in the optical transfer processes.

DETAILED DESCRIPTION OF THE PREFERRED EMBODIMENTS

Figure 3:
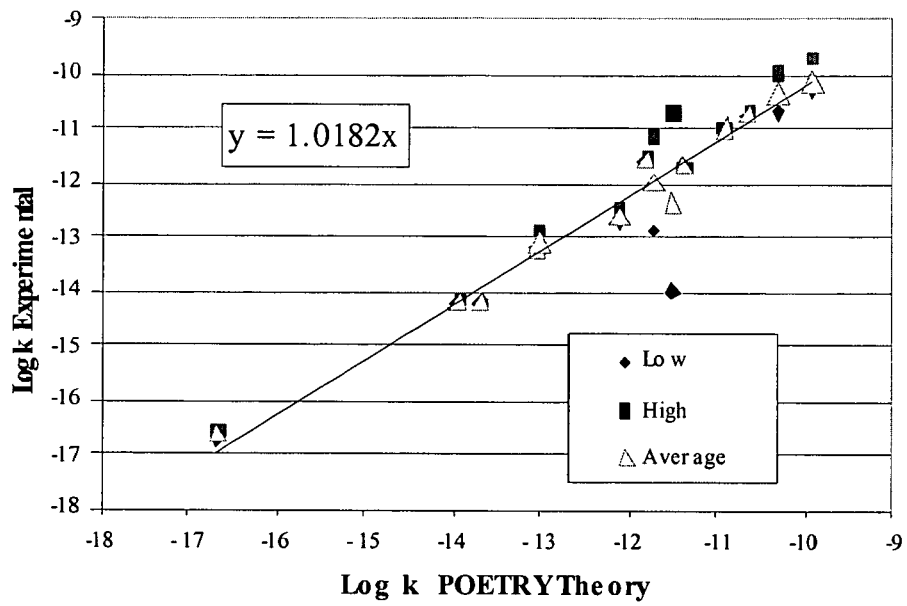
FIG. 3 is a graphical summary of agreement of POETRY Theory with the Experimental Data Base.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

The present invention is built upon specific proprietary physical/mathematical models used to quantitatively describe the interaction of radiation with gas phase energy transfer processes. These models will now be briefly discussed and summarized herein.

Physical/Mathematical Models

Underlying the present invention, a model has been developed to describe the rate coefficients for the transfer of electronic energy between atoms and/or molecules. The basic postulate is that the energy exchange occurs through simultaneous optical transitions within each of the respective participants that are coupled via the ambient radiation field. Since the transfers are assumed to involve only optical processes, the theory has been termed Purely Optical Electronic Transfer Reaction Yields (POETRY) Theory, as is so referred to herein. The postulated involvement of the ambient radiation field leads directly to the dependencies of the rate coefficients on the resonance energy and the product of the Einstein B coefficients for the stimulated emission, properties that have been observed for transfers involving atomic and/or molecular systems.

This section reports the results of investigations undertaken of fourteen systems involving the various electronic states of $O_2$, NF, NCl and I atoms. Many of these reactions are of critical importance to the Chemical Oxygen Iodine Laser (COIL) and/or the All Gas Iodine Laser (AGIL) systems. By comparing the theoretical results with the extensive experimental database it can be seen that the model is quantitatively consistent with available measurements.

For transfers involving molecular participants, the assumed optical nature of these processes enable division thereof into two groups, depending upon whether or not the overall electronic spin is conserved during the transfer. If the total spin is conserved, then all combination of rotational states of the two (diatomic) participants appear to contribute to the transfer rate coefficient; otherwise, only selected combinations make contributions. For example, excellent agreement with the experimental values is obtained for identical reactants such as $O_2(a)$-$O_2(a)$, NCl(a)-NCl(a) and NF(a)-NF(a) when all combinations of states rotating in the same direction at equal frequencies, ($\omega_A=\omega_B$) are assumed to make contributions to the rate coefficient. For the NCl(a)-NF(a) system, in which the rotational constants differ substantially, only those combinations of the rotational states for which the rotational frequencies are similar are found to contribute on a time weight basis. Finally, for the NF(a)-$O_2$(a) system, in which the participants have equal mass and therefore almost equal rotational constants and are expected to form a relatively stable complex, it was determined that assuming that all of the equal rotating states make contributions yields the best agreement.

Furthermore, the principles of conservation of energy and momentum require that coherent photons be produced by these transfer reactions in the exothermic direction. At sufficiently high reactant concentrations, these additional photons substantially augment the ambient radiation field, with resulting enhancement of the rate coefficients. This positive feedback process is used to explain the need for the reported "putative" rate coefficients that were invoked to describe the large COIL performance, and which differ from the accepted "standard" values. The theory offers plausible explanations for the currently observed performance in the COIL laser systems and predicts that additional scaling limits may be encountered above the 100 kilowatt level. Hardware modifications are suggested as possible avenues to circumvent these current and future operational limits.

Due to their importance in the fields of atmospheric, combustion, and more recently, gas-phase laser chemistry, the processes involving the transfer of electronic energy between electronically excited atoms and molecules have been the subjects of numerous investigations. The discovery of efficient liquid and gas phase reactions for producing high concentrations of meta-stable radicals such as $O_2(a^1\Delta)$, $NF(a^1\Delta)$ and $NCl(a^1\Delta)$ has stimulated new interest it these kinetic systems, and when combined with the development of the $O_2(a^1\Delta)$, single oxygen generator (SOG), and the discovery of the transfer process between $O_2(a^1\Delta)$ and atomic $I(^3P_{3/2})$,

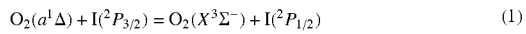

$$O_2(a^1\Delta) + I(^2P_{3/2}) = O_2(X^3\Sigma^-) + I(^2P_{1/2}) \qquad (1)$$

have resulted in the demonstration and continued development of the chemical oxygen iodine laser, commonly referred to as COIL. The performance of this COIL laser is critically dependent not only upon reaction (1), but upon two other electronic to electronic (E-E) processes involving $O_2(a^1\Delta)$ and $I(^2P_{1/2})$.

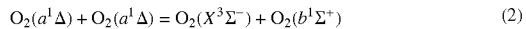

$$O_2(a^1\Delta) + O_2(a^1\Delta) = O_2(X^3\Sigma^-) + O_2(b^1\Sigma^+) \qquad (2)$$

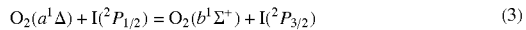

$$O_2(a^1\Delta) + I(^2P_{1/2}) = O_2(b^1\Sigma^+) + I(^2P_{3/2}) \qquad (3)$$

Consequently, these processes have received considerable attention because they consume the energy carrying $O_2(^1\Delta)$ and therefore set the limits on the ultimate system performance.

Completely analogous (E-E) transfer processes exist for the $NF(a^1\Delta)$ and $NCl(a^1\Delta)$ electronic states and with a few notable exceptions, the rate coefficients for processes involving these species have conflicting measurements, or have been measured only at room temperature. One reason for this poor state of affairs is that the rate coefficients for energy transfer between two free radical species are very difficult to measure. Nevertheless, they are important processes to the development of the kinetic systems required to power laser devices. Consequently, the existence of a theory that could reliably predict the energy transfer processes would be extremely desirable.

It is not surprising that numerous attempts have been made to predict or at least correlate the experimental data. For the most part, these efforts have been limited to E-V transfers, for which they have been moderately successful in establishing correlation of the rate coefficients with Franck Condon Factors and with the Resonance Energy, $\Delta E$. In particular, Schmidt and Setser have extended this semi-empirical approach to numerous quenching species with moderate success, discovering that they require some sort of "fitting parameter" that needs to be "refitted" from one system to another. It is this dependence upon the Franck Condon factors and the resonance energy that strongly suggests the optical nature of these processes.

From a fundamental, theoretical viewpoint, the progress has been even more limited. Attempts to predict the observations have required extensive calculations, and the results are far from convincing. There is continued discussion as to whether long range or short range forces are dominate and until recently, a "full" quantum mechanical treatment in three-dimensional space has not been attempted. This latter approach is extremely laborious requiring years of computational effort and therefore, a simpler, but yet reliable theory would be most welcome.

In an earlier publication by the inventor discussing the energy transfer process between $NF(b^1\Sigma)$ and $IF(X)$ in which a long range interaction approach was introduced which basically assumed that the transfer processes (E-E as well as E-V) took place via the concurrent transitions between the participants, it was proposed that hard collisions in the traditional sense were not required and that the governing feature of all of these energy transfers appeared to be the conservation of the rotational angular momentum of the participants. (This work was directed at the kinetic systems involving the more allowed transitions, which turns out to be a limiting case.) Although it was assumed that the concurrent transitions could be considered as purely optical in nature, the major role played by ambient radiation field was not then appreciated. It is this latter realization that has given rise to the substantially different approach now presented. The current supposition is that these processes are actually 3-body processes in which the ambient radiation field must be included as one of the participants. From this single postulate it is possible to arrive at a closed form expression for the rate coefficients that correctly predict the kinetic behaviors of all of these transfer processes over the temperature range of observations. In addition, due to the optical nature of these transitions, the theory provides plausible explanations for many of the observed anomalies between the measurements of different laboratories by taking into account the effects associated with the different radiation environments.

As a starting point, the "traditional", avoided crossing approach will be discussed along with the shortcomings of this approach for describing these types of energy transfer processes. The invocation of the ambient radiation field as the time dependent perturbation will then be shown to lead quite naturally to a closed form expression for the rate coefficients for the transitions between these adiabatic states. Furthermore, this theory will be applied to fourteen different energy transfer systems for which experimental data exists and it will be shown how the selection rules based upon total electron spin literally present themselves from the data. During these discussions, the sensitivity of these rate processes to the radiation environment and how the radiation from the transfer process itself can even influence this environment and thereby the effective rate coefficient will also be shown. Finally, an explanation for the observed "low performance" of the COIL generator/laser and an indication of how these performance limits could be improved by modified hardware design will be presented.

Theoretical Development

Traditional, Landau Zenner Type

An excellent description of the Landau Zenner model is given by Eyring, Walter and Kimble in their book, *Quantum Chemistry*. Since this approach has been traditionally used by investigators since its inception in the early 1930's, it is worthwhile to spend a little time to discuss the model's basic assumptions and limitations. The basic physical process that this approach has attempted to address is the mechanism by which a system, consisting of three or more atoms, can make a transition between two adiabatic states. These states are called 'adiabatic' states because, within the limits of the Born-Oppenheimer approximation, the crossing of these states is avoided due to the resonance interaction that exists between these states. The basis of the Born-Oppenheimer approximation is rapid motion of the electrons in comparison to the much heavier nuclei. Obviously, this ratio is based upon the relative masses, and will remain invariant until the velocities of the particles approach relativistic velocities. Consequently, for low energy processes, such as the energy transfer processes to which the present invention is directed, between partners that have nuclear masses on the order of 10

AMU's, the Born-Oppenheimer approximation is sufficiently valid to accurately predict the energy surfaces, as is evidenced by the ever current ability to correctly predict the electronic spectra. The recent calculation by Kaledin, of the energy surface for the $I(^2P_{3/2})+O_2(a^1\Delta) \Leftrightarrow I(^2P_{1/2})+O_2(X^3\Sigma)$ transfer, is an excellent example. The cross-cut for the co-linear reaction path in this energy surface is presented in FIG. 1.

One can clearly see that the states of the same symmetry, for instance, the 3/2 states corresponding to the reactant and product channels, do not cross but remain separate at an energy spacing of >30 cm$^{-1}$ up to the maximum energy shown of 5800 cm$^{-1}$. Furthermore, for the energy transfer starting from the $I(^2P_{1/2})+O_2(X^3\Sigma)$ channel, all co-linear trajectories with kinetic energies corresponding to 300K or less, will never come closer than ~100 cm$^{-1}$ to the product channel.

The question then is how such a crossing can occur, if by definition the two states 'avoid' each other. This avoidance is fundamental. The more exact the Q.M. solutions, the more the avoidance. The "traditional" Landau Zener approach has been to propose that the adiabatic wave functions can be expanded in terms of diabatic wave functions, which are not the true solutions to the full Hamiltonian but are rather solutions to the Hamiltonian that leave the interaction out. This is completely nonsensical. True, one can expand any wave function into any other set provided the full set is used. This is not what is being done. By using the wave functions that leave out part of the interaction, one is using a highly weighted, truncated, physically meaningless basis set. Naturally, one will be able to find non zero crossing terms with such an unreal approximation. The analogy is taking a quadratic equation, that has well defined roots, and expanding it in terms of a polynomial in which the linear term has been removed. Obviously, one can get a 'fit', that will have roots that are close to the original roots but it is fictitious. One does not describe a physical process by leaving out more of the physics.

A much more sound argument to describe the possibility of transitioning from one adiabatic curve to another can be found in the application of the Heisenberg Uncertainty Principle.

$$\Delta E \times \Delta t = h/2\pi \qquad (4)$$

where the energy uncertainty, $\Delta E$, to which each of these states is defined is determined by the longevity, $\Delta t$, of the state. Obviously, for stable, bounds states, the time interval is quite long and the energy uncertainty is correspondingly small. For those trajectories that correspond to co-linear collision such that the trajectory corresponds to a one transit of the potential curve, we can estimate the probability of transition by comparing the energy uncertainty with the energy separation between the two curves in this avoided crossing region. For an average velocity, v, the roundtrip transit time in the region of interest will be $$\Delta t = L/v \qquad (5)$$

where L will be on the order of one Bohr radius or 0.5 Angstroms. For the I+O$_2$ system the relative velocity for a head-on collision would be twice the average velocity at 300K of 2.77×10$^4$ cm/sec. This would yield a $\Delta t$=0.9×10$^{-13}$ seconds and an energy uncertainty, $\Delta E$ of 60 cm$^{-1}$. However, as this is still less the energy separation as computed by Kaledin, transitions for these "selected" end on trajectories do not occur in this energy range.

For the non-linear complexes, Kaledin does predict a smaller separation (~60 cm−1 at an angle of 50°). However, these glancing collisions will tend to form stable Van der Waals complexes for which the longevity of the state is quite large and therefore the energy uncertainty is correspondingly much smaller and once again the states remain separate via the uncertainty principle. Moreover, the anticipated sensitivity of a rate coefficient based upon this curve interaction would be expected to be extremely large and this is definitely not observed. It is worthwhile to note that the final formula of the Landau Zener model shows many of the characteristics that may be deduced from the Heisenberg Uncertainty approach as it is proposed that this is the real basis for its limited success to qualitatively describe these processes.

Furthermore, the above curve crossing does not predict any dependence upon the transition moments of the participants or the resonance energy in the exothermic direction. As mentioned earlier, this dependence of the rate coefficient upon the resonance energy and the product of the Einstein B coefficients (including Franck Condon Factors) has been repeatedly observed for numerous E-E and E-V processes.

As can be seen, even with the Heisenberg Uncertainty Principle approach, no gas kinetic transition is predicted. In the following section it will be shown how POETRY Theory address all of these issues, with quantitative as well as qualitative predictions of these rate coefficients being provided for fourteen systems investigated to date. The analysis will show that all of the trajectories leading to the stable Van der Waals complexes are contributing to the rate coefficient and that each of these process can be understood in terms of the usual Q.M. selection rules involving electron spin and angular momentum and in the case of iodine atoms, the involvement of nuclear spin.

Radiation Assisted Transfer Approach—POETRY Theory

The basic postulate underlying the present invention is that the electronic energy transfer processes are optical and are closely linked to the ambient radiation field. The inventive approach is to use the formal solutions for these optical phenomenon that were developed by the great physicists of the last century (Einstein's equations for radiation, Planck's radiation law, the Heisenberg Uncertainty Principle, the Born-Oppenheimer Approximation and the Drude theory for London Dispersion forces—Van der Waals forces) to arrive at a closed form analytical expression for the rate coefficient.

In the vast majority of cases of interest, one or the other, if not both, of the transfer partners will be in a meta-stable, electronically excited, state. This meta-stability infers that a spin flip is involved so that the transfer processes can be divided into two groups, depending upon whether or not the electronic spin is conserved. If the overall spin multiplicity changes, it has been found that agreement with experimental measurements requires that the transfer of electronic energy is only allowed between states with equal frequencies of rotation. One can rationalize this observation by arguing that the molecules or molecule and atom must align themselves in order to cross couple the electron spin with the angular momentum of the rotating nuclei. If the partners are not equal rotating then the probability of coupling is drastically reduced by a factor associated with the very small fraction of the time that they are aligned during the interaction time. In contrast, if the total multiplicity of the system is constant (i.e., an even number of spin flips), then the alignment along the axis is evidently not required and all combinations of rotational states appear to make contributions.

To begin, a generic electronic energy transfer system corresponding to the exchange of energy between two reactants (partners), A* and B will be investigated. As depicted in FIG. 1, it is assumed that species A is in an electronically excited state, A*, with an excitation energy, $E_A = h\nu_A$, above a lower energy state while its partner, B, is assumed to be in a lower energy state (which may or not be the ground state). B is assumed to be ready to undergo an energy transition to an excited state, B*, with energy $E_B = h\nu_B$. The basic mechanism being proposed is that as these partners approach one another, they form a quasi-stable complex due to the normal Van der Waals (Dispersion) interactions. This maintains the two partners at an average separation, R, which corresponds to the balance between the attractive forces to the centripetal force due to the angular momentum and gyro forces of the individual partner rotations. While the complex is in this state, the interaction between the partners is enhanced via the presence of the ambient radiation field. The time interval over which this radiation enhancement is operative is determined by the temporal coherence of the radiation.

This process is expressed as a kinetic reaction in the exothermic direction as

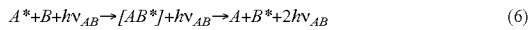  (6)

It is important to emphasize that it is being postulated that photons from the ambient radiation field are not only required for the transfer to take place, but for the exothermic direction they are produced via a process completely analogous to stimulated emission, as indicated by the dashed arrow in FIG. 2. One could treat the intermediate complex, [AB*], as a separate entity which undergoes a stimulated absorption or emission with the ambient radiation field. This requires estimation of the enhanced stimulated emission cross-section of this complex with the ambient radiation. This is the approach employed to describe the enhanced infrared cross-sections observed for molecular hydrogen in doped solid matrices and requires extensive computation.

Alternatively it is proposed that this optical process follows a "concerted" mechanism. In other words, during the course of the optical transition of the complex [AB]* with the ambient radiation field, the probability of this event occurring is identical to the probability that a transition will take place between each of the individual partners on their corresponding optical transitions in the presence of the radiation field generated by their counterpart. The ambient radiation field is not providing the energy but simply the coupling between the two systems. This simultaneous transition approach leads to a very tractable, closed form algebraic expression for the rate coefficients. This expression is found to agree with the "averages" of all of the available experimental measurements provided proper care is taken to follow the Q.M. based selection rules that follow directly from a consideration of the optical processes involved.

To arrive at the inventive expression for the rate coefficient, the rate of change of these species is expressed in terms of the number densities of all the reactants, [A*], [B] and $[\hat{N}(\nu_{AB})]$, the number density of photons. Following Einstein, one can express this number photon number density in terms of the radiation density, $[\hat{\rho}(\nu_{AB})]$, divided by the photon energy, $E = h\nu_{AB}$, $$[\hat{N}(\nu_{AB})] = \frac{[\hat{\rho}(\nu_{AB})]}{h\nu_{AB}} \quad (7)$$

Thus the rate equation becomes, $$\text{Rate} = \frac{-d[A^*]}{dt} = \frac{-d[B]}{dt} = \frac{d[h\nu_{AB}]}{dt} \quad (8)$$

$$= k[A^*][B][\hat{N}(\nu_{AB})] = \frac{k[A^*][B][\rho(\nu_{AB})]}{h\nu_{AB}}$$

For low densities of reactants, this ambient radiation density can be most conveniently expressed in terms of the Grey Body radiation emanating from the surrounding surfaces. This radiation can be expressed in terms of Planck's familiar expression for Black Body emission with the additional emissivity factor, $\epsilon$, namely, $$\rho(\nu) = \frac{\varepsilon(8\pi h\nu^3/c^3)\Delta\nu}{[\exp(h\nu/kT) - 1]} \quad (9)$$

The above expression is for the 'time average' radiation in all of the possible modes per cubic centimeter. Although this time-averaged radiation is incoherent, it can be viewed as the average of spatially coherent radiation that is also temporarily coherent over a sufficiently short time interval. This time interval is determined by the Heisenberg Uncertainty Principle. Since it is required that the photons be contained within this one cubic centimeter volume, the time interval is computed as the time required for the radiation to leave this sphere of one cc volume. In other words, $$\Delta t = \frac{r}{c} = \frac{\left(\frac{3}{4\pi}\right)^{\frac{1}{3}}}{c} = 2.075 \times 10^{-11} \text{ sec} \quad (10)$$

As can be seen, this is the basic interaction time of the process. It is the time for which the Grey Body Radiation can be considered to be both spatially and temporarily coherent in the one cc volume surrounding the interacting partners. The only requirement that this condition places on the complexes is that they be stable over this time period, which is substantially shorter than the time between collisions, the normal time limit of complexes. This condition will be satisfied up to a pressure of 10 atmospheres.

The rate R of the transfer process can be expressed in terms of either a 3-body equation, $$\text{Rate} = \frac{k_{3B}[A^*][B][\rho(\nu_{AB})]}{h\nu_{AB}} \quad (11)$$

or a 2-body process $$\text{Rate} = k_{2B}[A^*][B] \quad (12)$$

in which the photon density is included in the rate coefficient. For convenience in comparison with the experimental database, the 2-body formulation shall be used, but it should always be kept in mind that this is really a 3-body process. The 2-body expression is only valid when the radiation field is determined by the ambient Grey Body radiation of the surroundings. It must remain independent of any other spurious sources, such as might be generated by discharges, lasers or the transfer itself to be valid. As will be seen, many of the unexplained discrepancies between different experiments can be understood in terms of the presence of these spurious radiation sources.

The two-body rate coefficient, k2B, can be defined in terms of a probability of transfer per interaction, $P(R,v_{AB})$ times the gas kinetic collision rate coefficient, ko, $$k_{2B}=P(R,v_{AB})k_o \qquad (13)$$

The probability of transfer per interaction can likewise be defined in terms of a product of the radiation density and probability of transfer per photon, P(R), $$P(R, v_{AB}) = \frac{P(R)\rho(v_{AB})}{hv_{AB}} = \frac{P(R)\varepsilon(8\pi v_{AB}^2/c^3)\Delta v_{AB}}{[\exp(hv_{AB}/kT)-1]} \qquad (14)$$

Next, a collision cross-section for an E-E transfer, $<\sigma>$, is identified in terms of a differential cross-section, $<\sigma>$, at the average interaction distance, R, $$<\sigma>=\pi R^2 \qquad (15)$$

As previously mentioned, this R can be computed by equating the attractive forces to the centripetal forces to guarantee the conservation of angular momentum. However, experience has shown that these values for R are essentially equivalent to the distance corresponding to the minimum of the Lennard Jones Potentials, namely, σ, and so one can use either, which ever is more convenient, and obtain essentially equivalent results.

Because of the involvement of these complexes, if the rotational states of the participants are treated in the appropriate manner, the use of this average collision complex is equivalent to performing a full Monte Carlo trajectory calculation over a quantum mechanically derived surface. The finer details of the energy surface, that are produced from a full Q.M. surface calculation, as was done for the I+$O_2$ system, appear to not be important. The symmetrical surface generated from a Lennard Jones potential appears to work just fine. The justification of this claim, like the entire approach itself, is justified by the excellent agreement with experimental measurements.

By introducing a rotational population distribution function, $\Theta(T)$, it is possible to write a general expression for all the different types of transfer processes, in which the rate coefficient is simply the product of the relative average velocity, $\bar{v}$, and the above average cross-section times the appropriate rotational distribution.

$$k_o(R) = <\sigma>\frac{\sqrt{2}}{2}\bar{v}\Theta(T) \text{ All rotational states allowed} \qquad (16)$$

For the case where all of the rotational levels are allowed, $$\Theta(T)=1 \qquad (17)$$

For the case of non-rotating partners, $$\Theta(T) = \left(\frac{B_A}{kT}\right)\left(\frac{B_B}{kT}\right) \qquad (18)$$

one $\left(\frac{B}{kT}\right)$ factor corresponding to the fraction of the population in the (J=0) level for each specie.

For equal-rotating, identical partners ($J_A=J_B$), the desired rate coefficient for the state-to-state process can be expressed (approximately) in terms of the total vibrational state populations of each of the reactants by multiplying by the average rotational population factor, $$\Theta(T) = \left(\frac{B}{kT}\right)^2 + \frac{1}{12}\left[\left(\frac{\pi B}{8kT}\right)^{\frac{1}{2}} - \left(\frac{B}{kT}\right)^2\right] \qquad (19)$$

The first term corresponds to the complex formed from non-rotating partners. This term has a weighting factor of unity since all velocity trajectories will be allowed. The second term corresponds to the complexes formed from equal rotating partners. The weighting factor, $$\frac{1}{12} = \left(\frac{1}{2}\right)\left(\frac{1}{6}\right),$$

stems from the fact that only those molecules traveling in the same direction (⅙) and rotating in the same direction (½) will form stable complexes in which the two axes of the partners will maintain alignment.

Finally, for the case of almost equal rotating, non-identical partners, a one to one comparison of each of the rotational states must be performed to determine those combinations of rotational states that will interact. The basic condition is that only those rotational states for which the rotational frequencies match to within approximately 10%, will couple, i.e., $$B_e^A J_A(J_A+1)=\omega_A \approx \omega_B=B_e^B J_B(J_B+1) \qquad (20)$$

For systems like $O_2(a)$-NF(a), in which the rotational constants are close, i.e. 1.426 and 1.2224 cm−1 respectively, essentially all of the rotational states have a partner while for systems such as NCl(a)-NF(a), with substantially different rotational constants, 0.6736 and 1.2224 cm−1, there are multiple rotational states of NCl(a) for which there is no corresponding state of NF(a). As will be seen, it is this attention to detail that really demonstrates the precision of the inventive theory.

In all of the above expressions, the velocity, $\bar{v}$, is given by the familiar Maxwellian expression for average velocity $$\bar{v}=(8kT/\pi\mu)^{1/2} \qquad (21)$$

with μ as the reduced mass of the pair.

What now remains is to compute the probability of an energy transfer per photon per interaction, P(R). Since the inventive postulate is that these processes are optical, Einstein's famous equations for the probability of transition per unit time, P(v)/dt, for stimulated emission and/or absorption of radiation are used, namely, $$dP(v)/dt=B_{A*A}\hat{\rho}_B(v_{AB})=B_{BB*}\hat{\rho}_A(v_{AB}) \qquad (22)$$

where the spectral radiation density, $\hat{\rho}_B(\nu_{AB})$, is related to the radiation density, $\rho_B(\nu_{AB})$ and the band width $\Delta\nu_{AB}$ via the expression $$\hat{\rho}_B(\nu_{AB}) = \frac{\rho_B(\nu_{AB})}{\Delta\nu_{AB}} \qquad (23)$$

As previously mentioned, one of the novel features of this approach is that it is being postulated that the radiation being experienced by species A is coming from B combined with the ambient radiation field and vice versa. It will be shown how readily one can express the corresponding radiation densities in terms of well known molecular parameters, however, the overall interaction process will be discussed first in order to clarify the later discussions.

By postulate, the time of interaction, $\Delta t$, is equivalent to the temporal coherence time of the ambient radiation and this is related to the bandwidth through the Heisenberg Uncertainty Principle.

$$\left(\frac{\Delta E_{AB}}{h}\right)\Delta t = \frac{1}{2\pi} = \Delta\nu_{AB}\Delta t_c \qquad (24)$$

This delta function or "snapshot" approach allows the differential $dP/dt$ to be replaced with $P(R)/\Delta t$ in Eq. (16), because this is the probability that a transition will occur per interaction which takes time, $\Delta t_c$, to happen. Using equations (18) and (24), this probability can be expressed in terms of the band width, $\Delta\nu_{AB}$, $$P(R) = \frac{B_{BB} \cdot \hat{\rho}(\nu_{AB})}{2\pi(\Delta\nu_{AB})} \qquad (25)$$

The next step is to compute the radiation density that $A^*$ experiences from B. It should not matter whether the probability of $A^*$ undergoing a transition due to the field of B is computed or vice versa, since these probabilities must necessarily be the same. (One internal test for consistency is that the final expression for P must necessarily be symmetric in A and B.)

To compute $\rho(\nu)$, Hirschfelder, Curtis and Bird are followed, recognizing that the energy of interaction, $V_{INTERACTION}$, of each partner with the radiation field of the other is simply the product of the radiation density emanating from the partner and its own polarizability, $$V_{INTERACTION} = -4\pi\alpha_A\hat{\rho}_B(\nu_A)\Delta\nu_{AB} = -4\pi\alpha_B\hat{\rho}_A(\nu_B)\Delta\nu_{AB} \qquad (26)$$

This interaction energy is due to the London Dispersion forces that are defined as the instantaneous attraction of these electrons averaged over all the instantaneous configurations of the electrons of each of the partners. This interaction was first described by Drude using a semi-classical model (later demonstrated by a full quantum mechanical treatment to give the same result) which yielded the following expression for this energy of interaction, $$-4\pi\alpha_B\hat{\rho}_A(\nu_B)\Delta\nu_{AB} = V_{INTERACTION} = -\frac{3\alpha_A\alpha_B h\nu_A\nu_B}{\{2(\nu_A + \nu_B)R^6\}} \qquad (27)$$

where $\alpha_A$ and $\alpha_B$ are the polarizabilities of the respective partners and the $\nu_A$ and $\nu_B$ the fundamental frequencies related to $E_A$ and $E_B$ by Planck's famous law $$E = h\nu$$

Solving for $\hat{\rho}_A(\nu_B)$, $$\hat{\rho}_A(\nu_B) = -\frac{3\alpha_A h\nu_A\nu_B}{\{8\pi(\nu_A + \nu_B)R^6\Delta\nu_{AB}\}} \qquad (28)$$

Since only the transitions under consideration in A and B are of interest, all the other terms are ignored and the polarizabilities themselves are expressed in terms of the transition dipole moments, $R_{AA^*}$, using the expression for polarizability taken from Eyring, Walter and Kimble $$\alpha_A = \frac{2\nu_{AA^*}|R_{AA^*}|^2}{3h(\nu_{AA^*}^2 - \nu^2)} \qquad (29)$$

and a comparable expression for $\alpha_B$. It is now recognized that the effective frequency that $A^*$ experiences is a combination of the radiation field from B with frequency $\nu_B$ and the ambient radiation field which contains the frequency $\nu_{AB}$, with its associated bandwidth $\Delta\nu_{AB}$, that is characteristic of the coherence of the sources, usually the walls. FIG. 2 graphically shows that the shortest coherence length of the three frequencies involved, namely for $\nu_A$, determines the coherence length, $L_C$ of the reacting system. These frequencies interfere to produce an effective frequency which A can "see" to within the bandwidth $\Delta\nu_{AB}$, which is equal to the bandwidth corresponding to the coherence time or interaction time discussed earlier.

$$\nu = \nu_{BB^*} + \nu_{AB} = \nu_{BB^*} + \{(\nu_{AA^*} - \nu_{BB^*}) + \Delta\nu_{AB}\} = \nu_{AA^*} + \Delta\nu_{AB} \qquad (30)$$

Substituting (23) into (24) and dropping the squared terms in $\Delta\nu_{AB}$ yields $$\alpha_A(\Delta\nu_{AB}) = \frac{|R_{AA^*}|^2}{3h\Delta\nu_{AB}} \qquad (31)$$

The Einstein coefficients for spontaneous A and stimulated B emission are related to each other and to these same transition moments by the familiar relationships $$B = \frac{c^3 A}{(8\pi h\nu^3)} = \frac{8\pi^3 |R_{AA^*}|^2}{3h^2} \qquad (32)$$

so the transition polarizability, $\alpha_A$, can be expressed in terms of the Einstein coefficients, $A_{AA^*}$ or $B_{AA^*}$, $$\alpha_A = \frac{\lambda_A^3 A_{AA^*}}{64\pi^4 \Delta\nu_{AB}} = \frac{h B_{AA^*}}{8\pi^3 \Delta\nu_{AB}} \qquad (33)$$

Substituting Eq. (33) into Eq. (28) and then in turn into Eq. (25) while using Eq. (32) and performing the straightforward algebra, yields the relatively simple expression for the probability of transition for $A^* \to A$, $$P(R) = \frac{3h^2 B_{AA^*} B_{BB^*} \nu_A \nu_B}{\{4(2\pi)^5(\nu_A + \nu_B)R^6(\Delta\nu_{AB})^3\}} \quad (34)$$

As required, the expression is entirely symmetrical in A and B and could have just as readily have been derived by computing the probability that B would undergo a stimulated transition under the influence of the radiation field emanating from A*.

Combining Eqs. (34) and (14) yields the final expression for the probability of transfer, $P(R, \nu_{AB})$ $$P(R, \nu_{AB}) = \frac{6h^2 \nu_A \nu_B B_{AA^*} B_{BB^*}}{\{(2\pi)^5(\nu_A + \nu_B)R^6(\Delta\nu_{AB})^2[\exp(h\nu_{AB}/kT)-1]\}} \quad (35)$$

Until now the concern has been the state-to-state rate coefficients, one initial state for each of the reactants going to one final state for each of the products. To compare the theoretical results with the experimental measurements, it is necessary to compute the effective rate coefficient by taking a weighed average over all of these state-to-state transfers. In effect a Monte Carlo statistical averaging over all reactant states must be performed. If making the usual assumption of Boltzmann distributions, $\Phi_A(v)$, $\Phi_B(v')$, for vibration populations and summing over the reactant (v,v') and product (v",v"') states, then $$<\sigma> = \Sigma_{v,v'} \Sigma_{v'',v'''} \{<\sigma(v,v',v'',v''')>\} \quad (36)$$

in which the relative transition probabilities are explicitly included by means of the Franck Condon factors $\chi_A(v,v'')$ and $\chi_B(v',v''')$ for partners A and B, respectively, $$<\sigma(v,v',v'',v''')> = <\sigma>\chi_A(v,v'')\chi_B(v',v''')\Phi_A(v)\Phi_B(v') \quad (37)$$

Substitution of (37) into (36) and using (16) results in the final expression for the rate coefficient, for equal rotating reactants.

$$k = \sum_{v,v'} \sum_{v'',v'''} \left[ \frac{3\bar{v}h^2 \nu_A \nu_B B_{AA^*} B_{BB^*}}{\sqrt{2}\,(2\pi)^4 c^2 (\nu_A + \nu_B)(\Delta\nu_{AB})^2} \right] \quad (38)$$

$$\frac{\Phi_A(v)\Phi_B(v')\chi_A(v,v'')\chi_B(v',v''')}{R_0^4[\exp(h\nu_{AB}/kT)-1]}\Theta(T)$$

The $\Theta(T)$ has been used to generalize the expression for all of the various rotational cases.

Alternately, this rate coefficient can be expressed in terms of the coherence time, $\Delta T_c$, using equation (24)

$$k = \sum_{v,v'} \sum_{v'',v'''} \left[ \frac{3\bar{v}h^2 \nu_A \nu_B B_{AA^*} B_{BB^*} \Delta t_c^2}{\sqrt{2}\,(2\pi)^2 c^2 (\nu_A + \nu_B)} \right] \quad (39)$$

$$\frac{\Phi_A(v)\Phi_B(v')\chi_A(v,v'')\chi_B(v',v''')}{R_0^4[\exp(h\nu_{AB}/kT)-1]}\Theta(T)$$

Or even more fundamentally by using equation (10), $$k = \sum_{v,v'} \sum_{v'',v'''} \left[ \left(\frac{3}{4\pi}\right)^{\frac{2}{3}} \times \frac{3\bar{v}h^2 \nu_A \nu_B B_{AA^*} B_{BB^*}}{\sqrt{2}\,(2\pi)^2 c^4 (\nu_A + \nu_B)} \right] \quad (40)$$

$$\frac{\Phi_A(v)\Phi_B(v')\chi_A(v,v'')\chi_B(v',v''')}{R_0^4[\exp(h\nu_{AB}/kT)-1]}\Theta(T)$$

For most of these cases the exponential term, exp ($h\nu_{AB}/kT$) is >>1, and therefore Eq. (38) can be reduced to, $$k \sim k_0 \Sigma_{v,v'} \Sigma_{v'',v'''} \chi_A(v,v')\chi_B(v'',v''')[\exp(-h\nu_{AB}/kT)] \quad (41)$$

that has the exponential and Franck Condon dependencies referred to earlier.

Since there is little additional computational penalty in using the more exact expression (38) through (40), only these more exact expressions will be considered in the following comparisons with the experimental measurements.

Comparison with Experimental Results

The Selection Rules and Spectroscopic Input Parameters

Perhaps the best way to understand the selection rules is to demonstrate how they work on all of the fourteen systems investigated to date. Table 1 summarizes the electronic spin and angular momentum changes leading to the rotational selection rules, identification of electronic transitions and predicted rate coefficients. The final column shows average of experimental determinations. In Table 1, each of these fourteen transfer processes is listed in the order of increasing non-resonance energy, column two.

TABLE 1

| System | v | ΔΛ | ΔΣ | ΔΛ | ΔΣ | ΔΔΛ | ΔΔΣ | ΔΩ | Rotational | Type | k (cc/sec) | k (cc/sec) @ 300K |
|---|---|---|---|---|---|---|---|---|---|---|---|---|
| I*-NF(a) | 161 | 2 | 0 | 2 | 0 | 0 | 0 | 0 | All | Q-Q | 4.1E-11 | |
|  | 0 | 1 | 2 | 0 | 2 | 1 | 1 | J = 0 | M-Q | 7.1E-13 | 4.2E-11 | 7.1E-11 |
| I*-O2(X) | 279 | 0 | 1 | 2 | 1 | 2 | 0 | 2 | All | M-Q | | 2.2E-11 | 1.9E-11 |
| O2(a)-NF(a) | 404 | 2 | 1 | 2 | 0 | 0 | 1 | 1 | Equal | Q-Q | | 7.8E-13 | 2.4E-13 |
| NCl(a)-O2(X) | 1410 | 2 | 1 | 2 | 1 | 0 | 0 | 0 | All | Q-Q | | 1.6E-12 | 2.5E-12 |
| NF(a)-O2(X) | 1600 | 2 | 1 | 2 | 1 | 0 | 0 | 0 | All | Q-Q | | 1.2E-14 | 6.5E-15 |
| NCl(a)-I | 1695 | 2 | 1 | 0 | 1 | 2 | 0 | 2 | All | M-Q | | 4.8E-11 | 4.5E-11 |
| NCl(a)-NF(a) | 1856 | 2 | 1 | 2 | 0 | 0 | 1 | 1 | Equal | Q-Q | | 9.2E-14 | 6.0E-14 |
| I*-NCl(a) | 1879 | 2 | 0 | 2 | 0 | 0 | 0 | 0 | All | Q-Q | 6.8E-12 | | |
|  | 0 | 1 | 2 | 0 | 2 | 1 | 1 | J = 0 | M-Q | 5.3E-13 | 7.3E-12 | 1.0E-11 |

TABLE 1-continued

| System | v | ΔΛ | ΔΣ | ΔΛ | ΔΣ | ΔΔΛ | ΔΔΣ | ΔΩ | Rotational | Type | k (cc/sec) | k (cc/sec) @ 300K |
|---|---|---|---|---|---|---|---|---|---|---|---|---|
| NF(a)-NCl(X) | 2203 | 2 | 1 | 2 | 1 | 0 | 0 | 0 | All | Q-Q | | 4.2E-12  2.0E-12 |
| I*-O2(a) | 2400 | 2 | 0 | 2 | 0 | 0 | 0 | 0 | All | Q-Q | 2.5E-14 | |
|  |  | 0 | 1 | 2 | 0 | 2 | 1 | 1 | J = 0 | M-Q | 5.9E-14 | 8.4E-14  7.1E-14 |
| O2(a)-O2(a) | 2608 | 2 | 1 | 2 | 0 | 0 | 1 | 1 | Equal | Q-Q | | 2.2E-17  2.3E-17 |
| NCl(a)-NCl(a) | 3574 | 2 | 1 | 2 | 0 | 0 | 1 | 1 | Equal | Q-Q | | 1.9E-12  9.4E-13 |
| NF(a)-I | 3860 | 2 | 1 | 0 | 1 | 2 | 0 | 2 | All | Q-M | | 1.1E-12  4.2E-13 |
| NF(a)-NF(a) | 4021 | 2 | 1 | 2 | 0 | 0 | 1 | 1 | Equal | Q-Q | | 7.4E-15  6.0E-15 |

Note: Must include hyperfine structure of iodine to distinguish between magnetic dipole and electric quadrapole transitions.

In the next four columns are listed the electronic angular momentum, $\Delta\Lambda$, and electronic spin, $\Delta\Sigma$, changes of the two participants starting with the pump (left) and then the receptor (right). The next two columns show the changes in these quantities for the transfer pair and the change of the overall angular momentum, $\Delta\Omega=\Delta\Lambda+\Delta\Sigma$, for the pair, which is a reliable quantum number for Hund's case (a) coupling. In the last two columns, are shown the rotational states and the types of electronic transitions that have been found to give the most consistent agreement with the experimentally measured values for the corresponding rate coefficients. It can be seen that all of these observed selections of rotational and transition types correlate very nicely with the spin and angular momentum quantities. First and foremost, it is seen that all of the rotational states are found to make a contribution if the total change in the electronic spin for the pair is zero, $\Delta\Sigma=0$. This leads to the interpretation that the electron spins are so strongly coupled that their interaction takes precedence over the other properties.

Rule #1: If there is an even number of spin flips so that the same number of spins are pointing in the same direction as before the energy transfer, then the axes of the molecules do not have to be maintained in alignment and all combinations of rotational states from all trajectories make contributions to the rate process.

The next rule is just as apparent from the relative change of the spin.

Rule #2: If the change in electron spin is greater than zero, i.e. net spin flip, only those rotational states that can maintain their individual axes aligned (within ~10%) will contribute to the transfer process.

Obviously, if one of the partners is an atom, then the only rotational state of the partner that can maintain an alignment is the non-rotating, J=0, state, see the iodine Q-M transitions. When two diatomic molecules are involved then for combinations rotational states of the partners that are sufficiently close in their moments of inertia that they can find combinations of rotational states in which they can maintain the axis aligned over the relatively short interaction period will also make a contribution. It will be seen that for the NCl(a)-NF(a) system, only a few combinations are allowed while for the O$_2$(a)-NF(a) case, most of the nearly equal rotating combinations appear to contribute. For those partners that are identical, all combinations of rotational states with equal rotational frequencies and therefore quantum numbers ($J_A=J_B$) will contribute. Examples of these identical partners are the O$_2$(a)-O$_2$(a), NCl(a)-NCl(a) and NF(a)-NF(a) pairs.

It must also be kept in mind, that except for the non-rotating, $J_A=J_B=0$, the partners must be restricted to trajectories moving and rotating in the same direction. Otherwise, the gyro forces associated with these two tops will mis-align the axis. This is the explanation for the factor of (½) and (⅙) introduced earlier; see discussion following equation (19).

Rule #3: The standard selection rules for the optical transitions hold true for the partners taken individually.

Axiom to Rule #3: If more than one transition is possible, the rate coefficient is computed using the sum of all of the contributing transitions for the appropriate rotational levels.

This third rule and axiom become important for those cases in which there are both magnetic dipole (M) and electric quadrapole (Q) contributions in which the electronic angular momentum requirement restricts the magnetic dipole transition to J=0 while allowing all the rotational states for the quadrapole transition. For the magnetic dipole, there are five possible transitions with $\Delta\Lambda=1$, which are typically several orders of magnitude larger than the electric quadrapole transitions with $\Delta\Lambda=2$. For instance, $A_M=2.3$ sec-1 for iodine on the $F_2 \to F_1$ hyperfine transition whereas, $A_Q$ for iodine is estimated to be similar to the $A_Q$ for O$_2$(a-X), $A_Q=1.5\times10^{-4}$ sec$^{-1}$. Both of these electric quadrapole transitions involve a $\Delta\Lambda=2$ change. The two possible transitions for iodine are $F_4 \to F_2$ and $F_3 \to F_1$. Note that since the spin is not flipping in the iodine, all rotational states make a contribution. It has been found that by including the contribution of the electric quadrapole, the difference between O$_2$(a), NCl(a) and NF(a) pooling processes with I($^2P_{1/2}$) may be explained.

The spectroscopic input parameters used in the computation of the rate coefficients are listed below. The three outlined entries, the A coefficients for the (a-b) transitions in NCl and NF and the A coefficient corresponding to an electric quadrapole transition for iodine, are the only parameters for which experimental measurements were not available. The values for the (a-b) A coefficient have been estimated by taking ratios between the (a-X) and (a-b) transitions using the measured O$_2$ values and the known (a-X) for NCl and NF respectively. Next, the Einstein A coefficient for the electric quadrapole transition of iodine was assumed equal to the corresponding $\Delta\Lambda=2$, or (a-X) transition in oxygen. As can be seen by examination of Table 2, which is a list of spectroscopic input parameters used in POETRY Theory computations, these estimates of the unknown A coefficient yield POETRY predicted rate coefficients in excellent agreement with the available measurements.

TABLE 2

| Quantity | O2(X) | O2(a) | O2(b) | NCl(X) | NCl(a) | NCl(b) | NF(X) | NF(a) | NF(b) | I | I* |
|---|---|---|---|---|---|---|---|---|---|---|---|
| Te (1/cm) = | 0 | 7882 | 13120 | 0 | 9260 | 14984 | 0 | 11435 | 18877 | 0 | 7603 |
| we (1/cm) = | 1580 | 1509 | 1432 | 827 | 904 | 935.6 | 1141 | 1197 | 1197 | 1197 | 1197 |
| wexe (1/cm) = | 11.99 | 12.9 | 13.95 | 5.1 | 5.1 | 5.1 | 8.99 | 7 | 8.64 | 0 | 0 |
| Be (1/cm) = | 1.4455 | 1.426 | 1.4004 | 0.6468 | 0.6736 | 0.65 | 1.2056 | 1.222 | 1.2377 | 0 | 0 |
| De (1/cm) = | 32300 | 32100 | 33400 | 32300 | 32100 | 37974 | 32300 | 32100 | 32100 | 32300 | 32100 |
| A (1/sec) = |  | 1.5E−04 | 2.5E−03 |  | 0.70 | [11.9] |  | 0.17 | [2.9] | [1.5E−04] | 2.3 or 7.7 |
| Bands |  | 9 | 5 |  | 9 | 5 |  | 9 | 5 | 6 | 6 |
| Ip (e.v.) = | 12.08 | 11.09 | 10.44 | 12.00 | 10.84 | 10.14 | 12.00 | 10.57 | 9.65 | 10.45 | 9.50 |
| ALPHA × E24(cc) | 1.60 | 1.74 | 1.85 | 3.90 | 4.32 | 3.51 | 1.66 | 1.88 | 2.00 | 5.35 | 5.88 |
| MASS (gm) = | 32 | 32 | 32 | 49 | 49 | 33 | 33 | 33 | 33 | 129 | 129 |
| Re (A) = | 1.20 | 1.20 | 1.21 | 1.20 | 1.20 | 1.57 | 1.32 | 1.31 | 1.30 | 1.20 | 1.20 |
| E/k (K) | 113 | 113 | 113 | 224 | 224 | 224 | 224 | 224 | 224 | 326 | 326 |
| σ (A) | 3.43 | 3.43 | 3.43 | 3.67 | 3.67 | 3.67 | 3.67 | 3.67 | 3.67 | 4.95 | 4.95 |

Note:
The boxes indicate the estimated values for the electric quadrapole transitions based upon consistency with the experimental data base and the general character of these type of transitions. Note that the estimated value for the quadrapole moment for the iodine is close to that of the (a-X) transition of oxygen while for NF(a-b) and NCl(a-b) the estimates resemble the O2(a-b) transition. This is consistent with the corresponding change in the angular momentum, i.e. ΔΛ = 2 and ΔΛ = respectively.

It is also worth mentioning that 2.3, corresponding to the 2-1 hyperfine transitions of iodine, has been chosen as the effective radiative transition lifetime of iodine when interested in the $(a^1\Delta\text{-}b^1\Sigma)$ transition in its partner. This follows since only the F=2 nuclear hyperfine state of iodine has an angular momentum component that is equal to the Ω=2 axial component of the $a^1\Delta$. This is an extension of the basic equal rotation requirement for spin flipping transitions. For the $(a^1\Delta\text{-}X^3\Sigma)$ transitions coupled with iodine, there is no net flip of spin so all rotational combinations are allowed and $A_M$=7.7 sec$^{-1}$ is used.

The Franck Condon Factors used throughout this were computed using Morse Potentials based upon the above spectroscopic data. The FCF's for the $O_2$ and NF were taken from the literature or computed using standard programs designed for these purposes.

Evidence of Sensitivity to Radiation Environments

The greatest difficulty in making comparisons with the experimental data has been in attempting to estimate the radiation field that is present in each of the experiments. Unfortunately, but quite understandably, the investigators did not take this phenomenon under consideration. While this made the analysis more difficult, it also provided evidence of the sensitivity of the measured values of the rate coefficients to the type of walls used in the construction of the apparatuses. Fortunately, there were a sufficient number of experiments performed in quartz apparatus for which the Gray-Body emission can be reasonably approximated by a black body with an emissivity estimated at a value of e=0.9, and for which sufficient pains were taken to reduce the amounts of side light radiation from the atom generators. Dr. Heidner's classic investigation of the oxygen pooling reaction is a case in point. An explanation for the inability for Lilenfeld and Heidner to agree in the measurements based upon the presence of spurious radiation sources in the Lilenfeld facility follows. Although this effect was only a factor of two, it will be shown that the much larger discrepancies between experimental results up to several orders of magnitude can also be explained by the differences in the wall emissivities.

Table 3 lists sensitivities of experimental measurements to apparatus radiation environments and includes the low, high and average values from the various experimental measurements available in the literature. Also included in the table are the POETRY predictions for assumed emissivities of e=0.9 and e=0.01 corresponding to quartz and aluminum walls.

TABLE 3

| System | ν | Expt Low | Ref. | Expt High | Ref. | <Expt> | e = 0.9 | e = 0.01 |
|---|---|---|---|---|---|---|---|---|
| I*-NF(a) | 161 | 5.00E−11 | Heidner | 1.00E−10 | Herbelin | 7.07E−11 | 4.20E−11 |  |
| O2(a)-I | 279 | 1.68E−11 | Deakin & Husain | 2.14E−11 | Heaven | 1.9E−11 | 2.23E−11 |  |
| O2(a)-NF(a) | 404 | 2.00E−13 | Cha & Setser | 3.00E−13 | Lin & Stes | 2.45E−13 | 2.48E−13 |  |
| NCl(a)-O2(X) % | 1410 | 2.50E−12 | Ray & Coombe | 2.60E−12 | Hewitt | 2.55E−12 | 1.55E−12 |  |
| NF(a)-O2(X) % | 1600 | 6.00E−15 | Manke (Al) | 7.00E−15 | Selser | 6.48E−15 | 1.63E−13 | [1.15E−14] |
| NCl(a)-I | 1695 | 2.00E−11 | Henshaw(Al) | 1.00E−10 | Bower & Y | 4.47E−11 | 3.10E−10 | [4.84E−11] |
| NCl(a)-NF(a) | 1856 |  |  | 6.00E−14 | Setser | 6.00E−14 | 9.22E−14 |  |
| I*-NCl(a) | 1879 | 1.00E−11 | Yang | 1.00E−11 | Yang | 1E−11 | 7.30E−12 |  |
| NF(a)-NCl(X) | 2203 | 2.00E−12 | Setser Estimate |  |  | 2.00E−12 | 2.50E−11 | 4.20E−12 |
| I*-O2(a) | 2400 | 5.00E−14 | Derwent & Thrush | 1.00E−13 | Lilenfeld | 7.07E−14 | 8.40E−14 |  |
| O2(a)-O2(a) | 2608 | 2.00E−17 | Heidner etc. | 2.70E−17 | Lilenfeld | 2.32E−17 | 2.23E−17 |  |

TABLE 3-continued

| System | v | Expt Low | Ref. | Expt High | Ref. | <Expt> | e = 0.9 | e = 0.01 |
|---|---|---|---|---|---|---|---|---|
| NCl(a)-NCl(a) | 3574 | 1.25E−13 | Manke | 7.00E−12 | Henshaw | 9.35E−13 | 1.31E−13 | |
| NF(a)-I | 3860 | 1.00E−14 | Combe Lower Bou | 1.80E−11 | Setser | 4.24E−13 | 1.12E−12 | 3.50E−14 |
| NF(a)-NF(a) | 4021 | 6.00E−15 | Du & Setser | 6.00E−15 | Du & Setser | 6E−15 | 7.37E−15 | |

An interesting feature of Table 3 is that when the radiation environment is well characterized, excellent agreement is obtained between different experimenters and with the POETRY Theory predictions. However, when different experiments are conducted in apparatus that differ substantially in the estimated Gray-Body emission, as is the case for aluminum tubes or even quartz tubes coated with uncharacterized poly-fluoride waxes and undetermined "seasoning" then the scatter discrepancies between the results of different investigators can be orders of magnitude, but still within the range of POETRY predictions utilizing the corresponding uncertainty in the emissivities.

FIG. 3 presents a log-log plot of the agreement of POETRY Theory with the experimental data.

In spite of the fact that POETRY Theory is looking at transfer systems that range from gas kinetic to one in $10^7$ collisions, the theory is consistently well within experimental error. In fact, the graph clearly indicates that the experimental measurements suffer from an uncontrolled variable, which POETRY Theory suggests is the ambient radiation field.

Temperature Dependence of the $O_2(a^1\Delta)$ Pooling Reaction

Returning now to the discrepancy between Heidner and Lilenfeld, it is interesting to note that Heidner went to great lengths (light traps) to remove spurious radiation from the microwave discharge used for exciting $O_2(a1\Delta)$ generation while Lilenfeld did not. Consequently, one would expect that the POETRY Theory predictions should be able to transition from the Heidner results to the Lilenfeld results, not at just 300 K but over the entire temperature range of these experiments, just by adding a constant radiation term.

Figure 4:
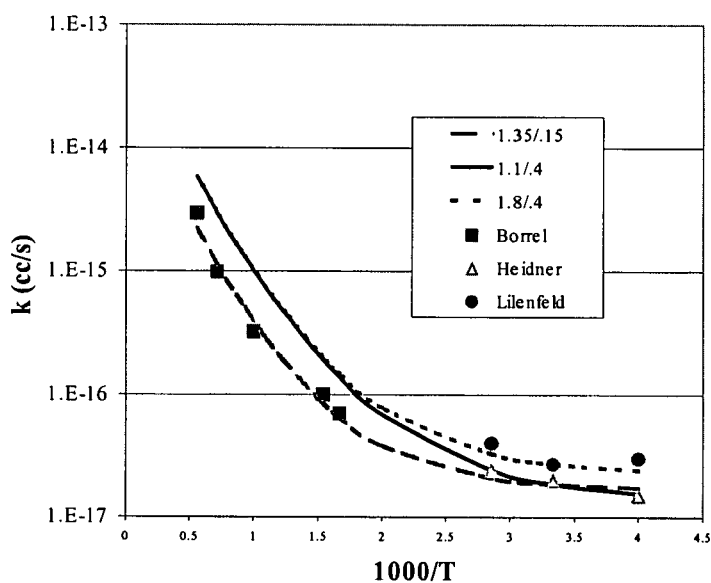
FIG. 4 shows temperature dependence of the $O_2(a^1\Delta)$ pooling reaction.

FIG. 4 presents a plot of the pertinent experimental results as plot versus the inverse of the absolute temperature times 1000. The lower, solid, curve corresponds to the POETRY predictions with "adjustment" of the proportioning of the radiation into a constant and a variable temperature term with the corresponding emissivities of 1.1 and 0.4. The sum, 1.5 yields the agreement with Heidner, k=2.0×10⁻⁷ (cc/s) and the ratio of emissivities, 1.1/0.4, yields the best agreement with Heidner's temperature dependence. (This approach attempts to remove some of the dependency on the absolute value of this rate coefficient, and A coefficients for the oxygen transitions, which are not really known to better than a factor of two, at best. Moreover, most of these rate coefficients are reported on a relative basis anyway, see Heidner.) Now added is a constant amount of radiation to the Heidner condition to simulate the added radiation in the Lilenfeld experiment. The constant radiation emissivity is increased from 1.1 to 1.8 to arrive at Lilenfeld's value of k=2.7×10⁻¹⁷. When this is done, it is found that the predicted temperature dependence of Lilenfeld is also achieved. This is one more confirmation to the sensitivity of these transfer processes to the radiation field. In passing, it is noted that the high temperature Borrell results can also be simulated quite well by adjusting the emissivities to 1.35 and 0.15 for the constant T and temperature dependent emissivities. The low value for the varying temperature emissivity is consistent with the fact that the blackbody radiation is coming from shock tube walls that are heated temporarily by the shocked gases. It is extremely difficult to estimate these values but it is encouraging that when one value is assigned for one temperature in the Borrell data, it works for all of the others.

Figure 5:
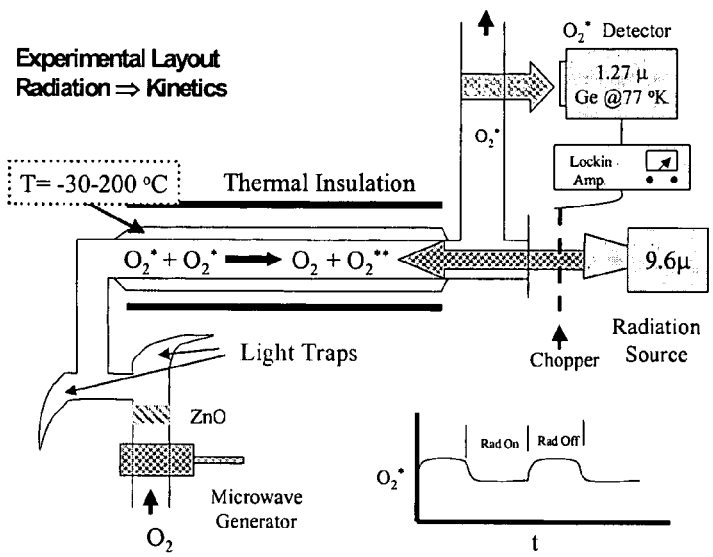
FIG. 5 is of the experimental layout to demonstrate the effect of radiation on the oxygen pooling rate.

Obviously, all of these results could be substantiated by measurement of the radiation fields in the (9.5μ) region. Alternately one could vary these radiation fields in a controlled manner to show the direct interaction. FIG. 5 presents a proposed modification of the Heidner/Lilenfeld type flow-tube experiment in which a separate radiation source is intentionally added. (This could be easily accomplished by an additional microwave generator on a separate oxygen flow.) By modulating this external radiation source at 9.5μ, it is possible to use LOCKIN frequency modulation technology to pick out the enhancement of the pooling rate, which will result in a lower $O_2(a^1\Delta)$ concentration. The factor of two discrepancy that it predicted should be readily observable using this technique.

Radiation Feedback in the COIL Generator

In the preceding sections it has been seen that both the gray body radiation from the reactor walls and perhaps even the gas itself appear to contribute to the transfer process. This suggests that when the densities of the reactants reach sufficiently high levels (such as the upper temperature region of Borrell shock tube experiments, FIG. 4), the radiation generated by the transfer processes themselves can become important, even to the point of dominating the radiation source. This can cause the "effective" rate coefficient to increase in an exponential yet predictable manner. The following arguments suggest that this phenomenon may be having a limiting effect on the existing COIL laser performances (typically ≅50% of theoretical has been the characteristic performance of the larger supersonic COIL lasers). According to the present invention, with appropriate modifications of the hardware, significant improvements in performance are achievable.

Figure 6:
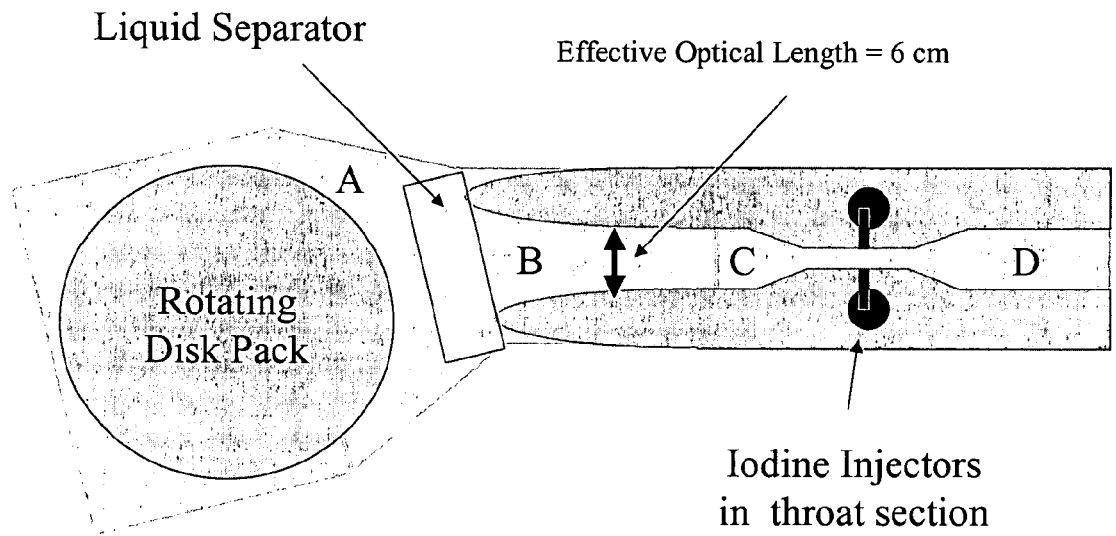
FIG. 6 shows the basic elements of a supersonic COIL laser.

The basic elements of a rotating disk supersonic COIL laser are shown in FIG. 6, which is a schematic representation of the RADICL device that has received extensive investigation. Numerous laser performance studies have been directed to documenting and attempting to unravel the reason or reasons for the less than theoretical performance of the COIL lasers. It seems that the basic dilemma stems from the fact that, although the chemical process for generating excited $O_2(a^1\Delta)$ is essentially 100% and disc generators have been shown to approach this limit at low densities, scaling attempts always seem to produce yields at the throat of the nozzle in the neighborhood of ≅50%. The common observation has been that the loss of the $O_2(a^1\Delta)$ is directly related to its density and the transit time between the generator and the throat. In order to fit the observed $O_2(a^1\Delta)$ density behavior, investigators have increased the basic pooling reaction (2) from the measured value of (2.2–2.7)× 10⁻¹⁷ (cc/s) to a "putative" value of 6.1×10⁻¹⁷ (cc/s). Arguments are made that this accounts for "other" processes that are taking place but thus far, there have been no unambiguous independent kinetic measurements to identify these "other" processes. This use of a "putative" rate coefficient gives rise to a major dilemma. Increasing this rate coefficient in the kinetic flow models results in too much heat released in the flow in the duct section (even with all the $O_2(b^1\Sigma^+)$ state being quenched at the walls and therefore not contributing to the heat in the flow). This in turn results in a computed downstream temperature that exceeds the measured values by 50–100 degrees. Thus the indications are that whatever phenomenon is responsible for this loss, it is not adding a significant amount of heat to the flow.

POETRY theory offers an explanation for this phenomenon that avoids the above "dilemma" by ascribing that the heat that would otherwise be generated by reaction (2) to produce the X and b states is actually converted to 9.5μ radiation which ultimately ends up in the generator hardware and not the gas. The first step will thus be to estimate the "putative" rate coefficient, after which the heat loss is estimated.

To compute the apparent, or "putative," rate coefficient, the radiation produced from the transfer process itself is added to the ambient radiation density to arrive at an enhanced rate coefficient. It is important to note that the radiation coming from the transfer process has a different bandwidth, namely, the velocity convolution (Doppler broadened) of the collision (pressure) broadened lines. This follows from the fact that the complexes are moving relative to one another, velocity shifted, and the maximum time the complexes exist is the time between collisions. The radiation density resulting from the transfer processes for small enhancements can be estimated using a steady state analysis which equates the rate of generation minus loss of the photons to zero. The rate of loss of a photons from a volume is given by the quotient, c/L, where c is the speed of light and L is an effective distances to the walls which naturally depends upon the geometry.

for Steady State $$0 = \frac{d[\hat{N}(\nu_{AB})]}{dt} = k[A^*][B][\hat{N}(\nu_{AB})]_{BB} - \frac{c[\hat{N}(\nu_{AB})]_{SS}}{L} \quad (42)$$

or $$[\hat{N}(\nu_{AB})]_{SS} = k\frac{c}{L}[A^*][B][\hat{N}(\nu_{AB})]_{BB}$$

The apparent rate coefficient (to first order) is just a ratio of the sum of the blackbody and transfer radiation divided by the blackbody radiation alone, times the blackbody only rate coefficient, $$k_{app} = \left(1 + \frac{[\hat{N}(\nu_{AB})]_{SS}}{[\hat{N}(\nu_{AB})]_{BB}}\right)k = \left(1 + \frac{Lk[O_2(a^1\Delta)]^2}{c}\right)k \quad (43)$$

It can be immediately seen that the effective rate coefficient is not a constant but depends on both the density of the reactants and the geometry (size) of the reaction volume. This is a very striking result and has major consequences on the scaling of reactive flows to larger devices. The values computed for the effective rate coefficient, $k_{eff}$, for different values of the characteristic dimension, L, of the reaction volume are presented in FIG. 7 in terms of the ratios of the effective to the low density limit or standard rate coefficient.

Also included for the sake of comparison is the experimental ratio of this "putative" rate to the standard rate. This "putative" rate coefficient was developed to achieve agreement in the RADICL laser device. The reaction volume in RADICL has the dimensions of 1 cm×25 cm×~10 cm and the effective L to produce this ratio falls in the range of 10–25 cm. It would require a full 3-D Hydrocode calculation in which the geometry in the reaction-produced radiation is properly taken into account to arrive at a more accurate result.

Figure 7:
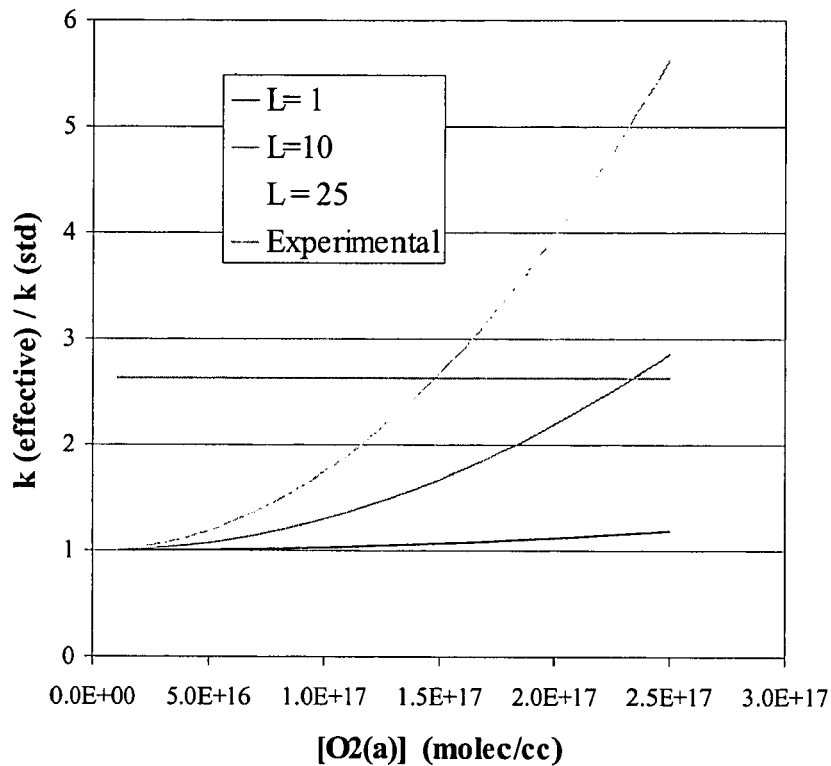
FIG. 7 displays the ratio of $O_2(a^1\Delta)$ effective pooling rate coefficient to standard rate coefficient versus the $O_2(a^1\Delta)$ density.

Obviously, one can vary the size of the transition section to determine if reducing the effective L will increase laser performance. Fortunately, this has been done directly or indirectly via the inclusion of vanes (such as in the water separator), spacers (mid and mini RADICL) or complete redesigns (VertiCOIL), and the observed trends are a matter of record. Performance (VertiCOIL>mini-Radical>mid-Radical>Radical) is inversely proportional to the size of the unobstructed optical volume (VertiCOIL<mini-Radical<mid-Radical<Radical). FIG. 7 clearly shows that a characteristic dimension, L~1 cm, will not show any enhancement of the pooling rate. This is quite consistent with the fact that the latter designs for improved generators all have twisted, small dimensional paths. With the improved knowledge as to the optical basis of these phenomenon that POETRY Theory provides, it stands to reason that the process of optimization of these generators should be greatly simplified, removing much of the trial and error.

Turning to the above mentioned energy balance that has been perplexing workers in the industry, according to POETRY theory, process (2) represents the major loss by which the 100% yield of $O_2(a^1\Delta)$ from the generator is reduced to the 50% at the throat. Each time this transfer process occurs, a 9.5μ photon is emitted into the chamber. (It is assumed that the $O_2(b^1\Sigma^+)$ produced from this reaction is quenched on the walls and therefore its energy goes directly into the hardware.) One can readily compute the thermal loss from the flow via this 9.5μ radiation and compare it to the case where the energy just goes into the flow. The energy loss per 9.5μ photon corresponds to 3.0 kcal per mole of lost $O_2(a^1\Delta)$. For the nominal diluent ratio of 4/1 at constant-pressure, a 50% loss would result in a temperature variance of 3.0×1000 (cal/mole)/(4/0.5×7 cal/deg)=>54 degrees. This means that if the total energy is assumed to go into the flow and not into radiation, the models would predict a temperature that is 54 degrees too high. On the other hand, if this elevated rate is not used, the predicted downstream density of $O_2(a^1\Delta)$ has been found to be too high, which, as has been noted, has given rise to the need to invent a 'putative' rate coefficient. This 54 degrees temperature differential is the same as the temperature difference between the predictions of models that use the "putative" rate coefficients and experimentally measured temperatures in RADICL.

What remains for a final confirmation is to actually observe the 9.5μ radiation directly in the COIL devices. Since the band consists of (9×5)=45 lines for each of the rotational pairs it will be somewhat diffuse. Nevertheless, with sufficient care this band system should be observable at the elevated densities of these COIL devices in which this radiation is predicted to be approximately 2 to 3 times the magnitude of the black body radiation. Naturally, if one was not looking for these emissions, they would easily go undetected.

Radiation Feedback in the COIL Cavity In the proceeding section evidence was presented of the radiation feed back for reaction (2) that involves optical transitions with two of the lowest stimulated emission cross-sections known. Of course, the density of the reactants, $O_2(a^1\Delta)$, was quite high, nevertheless, if such a process is active for this highly forbidden system, then it is not surprising if this same type of radiation enhancement is operative for other transfer systems. Such is indeed the case for reaction (3), and it can be seen that this reaction poses a "show stopping" challenge to the scaling of the COIL and similar lasers to large sizes. Fortunately, there is an engineering solution that presents itself immediately using the knowledge provided by POETRY Theory.

A quick look at Table 1 reveals that reaction (3) is one of the special cases with two active optical transitions, one Q-M with only one rotational level involved and one Q-Q with all the rotational levels. The transition with only one rotational level will be the most sensitive but because it only involves the non-rotating fraction of the rotational population it cannot become any larger than the product of fraction of the population in the nuclear non-rotating state, $$\left(\frac{B}{kT}\right)$$

and the gas kinetic collision rate coefficient, $k_{GK}$, or ignoring the smaller terms $$\sim \left(\frac{B}{kT}\right) k_{GK} \approx 5 \times 10^{-13} (cc/\text{sec}).$$

Although this is approximately four times larger it will only moderately affect the laser performance. In contrast, the Q-Q component involves all of the rotational states and therefore its upper limit is $k_{GK}$, or $5 \times 10^{-11}$ (cc/sec) and therefore, this enhanced process will compete effectively with the basic transfer process (1) for the excited state oxygen. Needless to say, this is expected to have a major influence on the performance on those COIL lasers for which the cavity conditions are such as to initiate this non-linear process. One can obtain a rough order of magnitude size of laser that will be approaching the threshold of this enhancement process using the same steady state approach as used above. One finds that the cavity conditions for a supersonic COIL will be conducive to achieve this threshold condition at a power level somewhere between the nominal 100–200 KW. This threshold will dependent on a number of variables such as wall reflectivity and shapes, temperature and velocity of the flow and the 1.315 micron cavity threshold conditions. Above 200 KW it will be necessary to optically isolate the modules to keep them below threshold. This can be achieved through the use of front surface dichroic mirrors in dog-leg configurations that transmit the 1.315 micron laser flux but do not pass the 2400 $cm^{-1}$ transfer enhancing radiation. An alternative would be to find a gas or liquid that would accomplish this same isolation but not distort the beam quality of the primary beam. A second alternative would be to keep the lasers to the 100 KW level and combine the beam exteriorly in an array fashion. None of these is inexpensive, but the alternative is an inefficient and possibly self destructive laser since it would be difficult to control where the spurious radiation would go at this ~100 KW level.

Incorporation of the Restricted Velocity Distributions

Application of POETRY Theory to electronic to vibrational energy conversion leads naturally to the requirement of a restricted velocity distribution. To this point, it has been assumed that all collisions, regardless of the relative velocities of the partners, resulted in the formation of Van der Waals like complexes. The implicit assumption is that the interaction, "dispersion", process is somehow forming stronger than usual complexes. Further study, in particular, analysis of the E-V processes between NF and HF molecules has made it clear that is necessary to introduce a velocity restriction to explain the substantial differences between transfer processes that would otherwise be predicted to have identical properties. The introduction of this factor then presented a dilemma in that it literally undid the prior fits to the experimental data for those systems for which the Van der Waals bonding, as estimated from the Lennard-Jones parameters, was small, i.e. on the order of <200 $cm^{-1}$. It was then discovered that the resolution of the problem is to explicitly assign an additional "stabilization" energy to the complex which is equivalent to the energy of the ambient photon that is immediately present to the complex. This added stabilization energy is capable of offsetting the effect of the restricted velocity distributions for not only those resonant transition but not for the highly resonant transitions. It is imperative that this added stabilization be related to the mis-resonance energy or else, the difference between the NF(a) and NF(b) quenching processes via HF can no longer be explained. In other words, it is not just a stabilization energy associated with excitation of the partners. The significance of this finding cannot be overemphasized for it is supporting evidence of the intimate role played by the radiation field in kinetic processes, in general. Beginning with examination of the E-V processes, it will be shown that these same considerations are able to explain unexpected behaviors in E-E, E-T, V-V, V-T and finally V-R transfers where T=translation and R=rotation energy.

Electronic to Vibration with Heteronuclear Partners

The extension of POETRY Theory to these gas phase kinetic systems was anticipated to be straight-forward. For the electric dipole transitions associated with vibrational states of heteronuclear molecules, the application of POETRY Theory should be simply a matter of using the appropriate Einstein coefficients associated with the particular transitions of interest. There is, of course, one important restriction: that due to the involvement of the motions of the nuclei only the non-rotating states of the vibrational partner should contribute, regardless of whether or not the spin is conserved. This follows from the same Born Oppenheimer approximation.

As mentioned above, it has been found that it became increasingly important to take into account the restrictions on the relative velocities of the partners colliding to form the complexes. An excellent example of this effect is readily provided by applying POETRY Theory to the two E-V transfers between NF(b) and NF(a) with the lowest vibration level of the ground state of HF. If the bonding in the complexes is assumed to be relatively strong, (E>> kT) then all of the velocities make contributions. When this assumption was made, the POETRY Theory prediction for quenching rate coefficient for both the NF(b) and NF(a) states by HF(0) was computed to be the same value, i.e. (k=7×1–13 cc/s) the gas kinetic collision rate for the J=0 rotational states of the partners. The value agrees well with the NF(b)-HF measurement by Habdas and Setzer but is more that a factor of 100 greater than the value (k=3×1–15 cc/s) for NF(a)+HF reported by Du and Setser. This represented the first "apparent failure" of POETRY Theory to be consistent with experimental data. The NF(a) system was actually more resonant than the NF(b) system, 126 $cm^{-1}$ versus 294 $cm^{-1}$, and even though the product of the NF(A-X) and HF(0-3) A coefficients is substantially smaller than for the NF(b-a) and HF(0-2) product it is still sufficiently large that POETRY Theory predicted the collision frequency limit for both systems. Accordingly, it was necessary to look more closely at the complex formation assumption that had been used and it was decided that the relative velocities of the colliding partners had to be taken into account. In other words, the caliber of the model was raised to a full trajectory calculation with sensitivity to velocity distributions.

It stands to reason that only those collisions with relative velocities that are less than or equal to the complex bonding should make contributions. Therefore, it was decided to explicitly include a velocity restriction factor, F(c), that is defined as the fraction of the collisions taking place with velocities less than or equal to "c", the velocity corresponding to a kinetic energy equal to the bonding energy of the complex, $V_{cplx}$. Dr. Sidney Bensons book entitled, *The Foundations of Chemical Kinetics*, has an excellent discussion on "Velocity Groups" and one can literally lift the need expression from his text. It should be noted that F(c)=1−f(c) herein has been defined as the compliment of the f(c) in Benson's text.

$$F(c) \cong 1 - \frac{2c}{a\pi^{\frac{1}{2}}} e^{\frac{-c^2}{a^2}} \left(1 + \frac{a^2}{2c^2}\right) \quad (44)$$

where $$c = \frac{2V_{cplx}}{\mu} \text{ and } \alpha^2 = \frac{2kT}{\mu}$$

As seen, for values of $V_{cplx} \gg kT$, this factor assumes a value of unity whereas it drops off precipitously for $V_{cplx} < kT$.

The inclusion of this velocity restriction factor did indeed substantially reduce the NF(a)+HF(0) rate coefficient, making it essentially zero and at the same time destroying many of the previous fits with the E-E transitions between the first row (periodic table) elements not to mention the NF(b)-HF (0) transfer processes itself. In summary, it was found that for complexes between partners with shallow Lennard-Jones potentials, one could not obtain agreement with the experimental results.

Faced with the prospect of abandoning the entire theory or of finding another physical effect that had been overlooked thus far, an exciting discovery was made. If one also makes the assumption that a stabilization effect due to the presence of the resonance photon must also be included into the bonding energy of the intermediate complex, then all of the previous results were once again valid and agreement with both the NF-HF systems was also achieved. This explicit inclusion of the photon energy is equivalent to assuming that the intermediate complex acts as though it were being stabilized by the presence of the ambient radiation field. (A little reflection suggests several possible explanations. The very basis of POETRY Theory is that the presence of the resonant photon causes the dispersion energy to increase dramatically yielding enhanced transition probability. This increased dispersion energy is also stabilizing the complex and therefore the photon energy needs to be included. Alternatively, one could also argue that with the presence of the photon, resonant electronic structures result and thus the added stability is provided by a resonance energy.)

Figure 8:
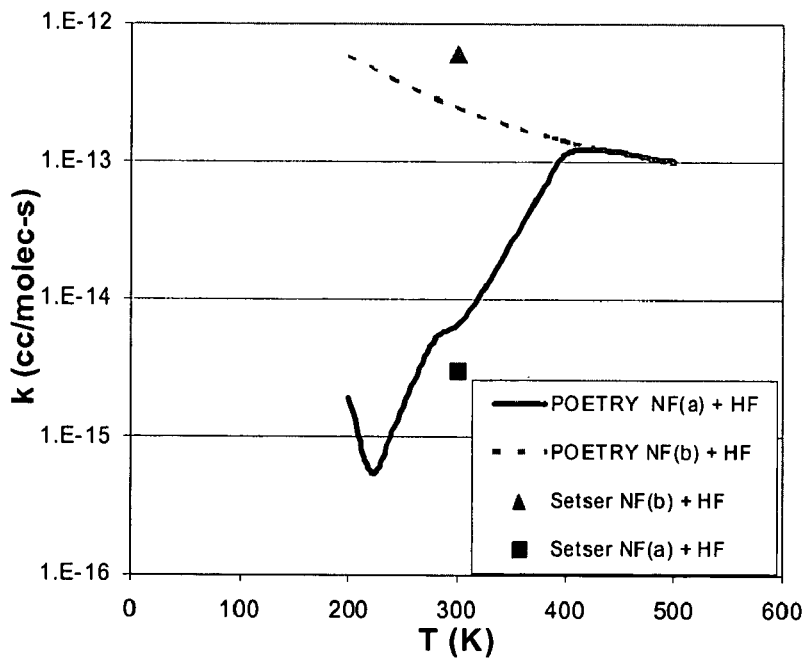
FIG. 8 is a comparison of POETRY predictions for the NF(b->a) and NF(a->X) transfers with HF.

The results of the inclusion of both of these effects into the POETRY Theory model for the two HF-HF systems are presented in FIG. 8. The triangle and upper dashed curve are the experimental measurement and POETRY Theory prediction for the NF(b) quenching by HF(0) and the lower solid curve and square are for the NF(a)+HF(0) quenching processes when including both the velocity restriction and the addition of the resonance photon energy to the complex bonding energy. Although having only the T=300 K data point, it is shown in the subsequent section on the V-V and V-T transfers that this negative temperature dependence is characteristic of HF quenching processes.

Table 4 lists the state to state NF(b) and NF(a) E-V transfers with HF, including the resonance mis-match energy, n, along with the Lennard-Jones, L-J bonding energies and the enhanced bonding energies for each of the various possible combinations of transfer. The additional surprise that POETRY Theory provided is that, contrary to common belief, the smaller the resonance energy the better/faster the transfer processes. POETRY Theory shows that this is only true between partners for which the complex stability is sufficiently large without the added stabilization provided by the radiation photon, i.e. for the heavier species, such as iodine. As the table clearly reveals, excellent agreement with experiment is obtained, but not via the originally suspected transitions. Since first row atoms are involved in the NF-HF transfers, the low L-J binding energies are insufficient to support complex formation at 300K for the highly resonant transfers, i.e. NF(b-a) with HF(0-2) and NF(a-X) with HF(0-3). Instead, the effective transfer combinations at 300K are NF(b-a) with HF(0-1) and NF(a-X) with HF(0-2). These are surprising results indeed.

TABLE 4

| System | v | L-J | L-J + v | @ 300K | k (0-V) | k total | Reference |
|---|---|---|---|---|---|---|---|
| NF(b-a) − HF(0-2) | 294 | 81.5 | 375.5 | 0.276 | 6.01E−14 | | |
| NF(b-a) − HF(0-1) | 3484 | 81.5 | 3565.5 | 1 | 2.13E−13 | | |
| NF(b-a) − HF Total | | 81.5 | 81.5 | | 2.73E−13 | 6E−13 | Cha |
| Microscopic Reverse Transfer | | | | | | | |
| NF(a-b) − HF(2-0) | −337 | 81.5 | 418.5 | 0.276 | 1.70E−14 | | |
| NF(a-b) − HF(2-1) | −3484 | 81.5 | 3565.5 | 1 | 8.66E−17 | | |
| | | | | | 1.71E−14 | | |
| Effective Reverse Transfer | | 81.5 | | | | | |
| NF(a-b) − HF(3-0) | 3848 | 81.5 | 3929.5 | 1 | 2.88E−14 | | |
| NF(a-b) − HF(3-1) | −110 | 81.5 | 191.5 | 0 | 0.00E+00 | | |
| NF(a-b) − HF(3-2) | −3444 | 81.5 | 3525.5 | 1 | 2.10E−17 | | |
| NF(a-b) − HF Total | | | | | 2.88E−14 | | |
| Effective Reverse Transfer | | 81.5 | | | | | |
| NF(a-b) − HF(4-1) | 3308 | 81.5 | 3389.5 | 1 | 1.26E−14 | | |

TABLE 4-continued

| System | v | L-J | L-J + v | @ 300K | k (0-V) | k total | Reference |
|---|---|---|---|---|---|---|---|
| NF(a-b) – HF(4-2) | 469 | 81.5 | 550.5 | 0.525 | 5.92E–14 | | |
| NF(a-b) – HF(4-3) | –4024 | 81.5 | 4105.5 | 1 | 8.02E–18 | | |
| NF(a-b) – HF Total | | | | | 7.18E–14 | (5-15)e–13 | Habdas |
| NF(a-X) – HF(0-3) | 126 | 81.5 | 207.5 | 0 | 0.00E+00 | | |
| NF(a-X) – HF(0-2) | 1799 | 81.5 | 1880.5 | 1 | 6.50E–15 | | |
| NF(a-X) – HF(0-4) | 3576 | 81.5 | 3657.5 | 1 | 1.73E–20 | | |
| NF(a-X) – HF Total | | | | 0 | 6.50E–15 | 3.00E–15 | Du |
| NF(b-a) – DF(0-2) | 835 | 81.5 | 916.5 | 0.906 | 9.39E–14 | | |
| NF(b-a) – DF(0-1) | 2903 | 81.5 | 2984.5 | 1 | 1.05E–13 | | |
| NF(b-a) – DF Total | | | | | 1.99E–13 | . . . <5e–13 | Cha |
| NF(b-a) – HCl(0-3) | –1179 | 87.2 | | 1 | 8.79E–14 | | |
| NF(b-a) – HCl(0-2) | 3576 | 87.2 | | 1 | 2.91E–14 | | |
| NF(b-a) – HCl(0-1) | 5457 | 87.2 | | 1 | 1.19E–15 | | |
| NF(b-a) – HCl Total | | | | | 1.18E–14 | 1.80E–14 | Du* |
| NF(b-a) – NO(0-3) | 1897 | 101 | 1998.0 | 1 | 1.06E–14 | | |
| NF(b-a) – NO(0-2) | 3717 | 101 | 3818.0 | 1 | 1.28E–16 | | |
| NF(b-a) – NO(0-1) | 5565 | 101 | 5666.0 | 1 | 1.09E–17 | | |
| NF(b-a) – NO Total | | | | | 1.07E–14 | 1.60E–14 | Du** |

*Badly behave experiment, see reference.
**A coefficients estimated from HCl by ratio of dipole moments, N0/HCl = 0.15/1.3

Naturally, one must ask if these results are consistent with all that is known experimentally. The answer is affirmative. Both of the quenching experiments involved the measurement of the disappearance of the excited states and not the appearance of the products. Thus the POETRY predictions of the rate of removal are consistent. In a subsequent experiment performed by Habdas and Setser, the rate of appearance of NF(b) as a function of the presence of HF(v=3,2,1) was monitored and rates were extracted assuming a generic model involving multiple transfer paths, the most resonant being preferred. However, it appears to be beyond the sensitivity of this method to uniquely determine the responsible transfer processes. The overall rates coefficients (5–15×10–13 cc/s) were deemed consistent with the measurements for the quenching processes based upon the principle of microscopic reversibility.

However, similar modeling results could be obtained using the POETRY predicted rate coefficients and processes. In a system as complicated as HF with all of the V-V processes coupling the states it would be extremely difficult to uniquely uncouple these processes. From Table 4 it is seen that POETRY predicts a reverse, populating process of NF(b) via HF(3) pumping. The POETRY predicted process is consistent with experimental experience when attempting to pump NF(a) to NF(b) using HF(v). More enhancement has been obtained using the F+HI->HF(v=4,3,2,1)+I which produces HF(4) as well as HF(3) rather than from the F+H₂ reaction which primarily produces HF(2) and HF(1). As can be seen from the table, these upper states are predicted to be far more efficient pumps of NF(a->b) than the lower states. Several other system, DF, HCl, and NO are included in the table. The agreement is consistently good except for HCl where the experimental results are in doubt.

Electronic to Vibration with Homonuclear Partners

Transfers to homonuclear molecules follow the same photon enhancement mechanism as to heteronuclear molecules with the dipole moment being induced in the homonuclear by the nonuniform charge distribution in its partner. Obviously, it is more difficult to estimate the transition dipole that is induced by a charge in close proximity, but this does not negate the physics. Examples of collisionally enhanced dipole transition moments leading to Infrared activity are well known and in fact, have been utilized in recent efforts to measure atom density in doped (p-H2) clusters. One can attempt a simple estimate of these transition moments in the following manner. The induced static dipole in partner B, $\mu_B$, that is induced by the dipole in partner A, $\mu_A$, at a distance of $r_{AB}$ is given by the familiar expression utilizing the static polarizability of partner B, $\alpha_B$.

$$\mu_B = \frac{\alpha \mu_A}{r_{AB}^3} \quad (45)$$

The quantity being sought is the derivative of $\mu_B$ with the inner-nuclear separation of the atoms in B, namely, $$\left(\frac{\partial \mu_B}{\partial r_B}\right) \approx \frac{\mu_A}{r_{AB}^3}\left(\frac{\partial \alpha_B}{\partial r_B}\right) \approx \frac{\alpha_B \mu_A}{r_{AB}^3} S_{V-V'} \quad (46)$$

Here it is assumed that the change in polarization is approximated by the total static polarizability times the overlap between the vibrational wave functions of molecule B.

Squaring this expression, making the identification that $R_{BB*}=(\partial \mu B/\partial r_B)$ and utilizing the relationship to the Einstein B coefficient given in equation (32), $$B_{BB*} = \frac{8\pi^2 \alpha_B^2 \mu_A^2}{3h^2 r_{AB}^6} S_{V-V'}^2 \quad (47)$$

The overlap integrals can be computed using standard techniques. An excellent source for FCF and in fact the Einstein A coefficient directly is provided by Dr. LeRoy's computer code called LEVEL. This code is available at no charge from the University of Canada. Using a dipole moment of 0.25 Debyes for NF(b) and 0.5 Debyes for NF(a), a polarizability of 0.8×10–24 cm3 for H2 and a Van der Waals distance of 3.3 Angstroms equation (45) yields a value of 5.5×10–3 D and 1.1×10–2 D for the dipole moments induced in H2 by NF(b) and NF(a) respectively. Assuming a Morse potential for H2 LeRoy's code yields the A coefficients for the various transitions of H2 as given in Table 5, which compares the E-V transfer rate coefficients between NF(a,b) and H₂(0). These in turn yield the rate coefficients for the various transfers listed. The sums of these transfers are compared with the measured values at 300K.

TABLE 5

| Transfer | A coeff sec-1 | k POETRY cc/s | k Exptl cc/s |
|---|---|---|---|
| NF(b-a) + H2(0-1) | 4.10E−05 | 3.16E−15 | |
| NF(b-a) + H2(0-2) | 1.40E−05 | 2.76E−14 | |
| NF(b-a) + H2(0-3) | 4.70E−06 | 5.99E−29 | |
| Total | | 3.08E−14 | 2.50E−14 |
| NF(a-X) + H2(0-1) | 1.60E−04 | 1.82E−40 | |
| NF(a-X) + H2(0-2) | 5.60E−05 | 4.61E−19 | |
| NF(a-X) + H2(0-3) | 1.70E−05 | 5.33E−17 | |
| NF(a-X) + H2(0-4) | 7.00E−06 | 3.36E−21 | |
| Total | | 5.38E−17 | 1.2e−17 (<1.3e−16) |

As shown, the agreement is quite satisfactory. A similar analysis of the NF(a,b)+N2(0) transfers reveals that the POETRY predicted rate coefficients for the E-V processes are quite small, on the order of $10^{-21}$ as compared to the $10^{-17}$ reported.

In accordance with this and other objects, the present invention is directed to the use of the POETRY Theory mathematical model to determine the proper Ambient Electromagnetic Radiation Environment (AERE) that will produce the optimum performance of gas phase chemical laser systems. The inner surfaces of the particular laser system of interest are to be so constructed to minimize the radiation environment at prescribed frequencies that are determined using the POETRY Theory. The prescribed electromagnetic radiation can be moderated by absorption of these frequencies into the walls that are maintained at reduced temperatures to enhance this absorption process. This approach represents a major improvement over the prior art trial and error techniques.

Accordingly, the performance of gas phase chemical lasers can be significantly improved over their pre-existing levels by exercising careful control over the Ambient Electromagnetic Radiation Environments through the judicious application of the following methodology.

The first step is to apply POETRY Theory to the energy transfer processes in order to determine the specific dependencies of each of these processes upon the ambient electromagnetic radiation environment (AERE) and kinetic temperature, after which the POETRY Theory is used to determine the spectral frequency bands that need to be controlled for each of these kinetic processes.

Next, the necessary analytical calculations are performed to estimate the effects of moderating the AERE at these frequencies. This can include scaling calculations to determine threshold conditions and optimum flow configurations and conditions to control the radiation at these frequencies. This control can be exercised through the shapes, contours, and temperatures of the nozzle and surrounding hardware. These frequencies are then monitored in subscale and scaled flow experiments to quantify the POETRY Theory predictions and analytical calculations.

Anti-reflective coatings, designed to reduce the reflectivity of the undesired spectral ranges to the surfaces surrounding the gas flow, are applied for the purpose of mitigating the AERE in these frequencies ranges. This can include the use of dichroic optical isolators to isolate the flow component modules that are combined to construct a larger laser.

Finally, radiation sources and reflective coatings are provided to surfaces surrounding the reaction chamber to promote those kinetic processes that are beneficial to the laser performance. The appropriate spectral frequencies in the AERE are then monitored to determine the efficiencies to which the foregoing steps have been successful.

The containment walls for Singlet Oxygen Generator (SOG) should be constructed of a material with a high emissivity (low reflectivity) in the 4–12 micron spectral region and should be cooled to minimize the radiation in the spectral region. The walls of such a device should be thermally non-conducting to minimize heat transfer to/from the flow. In addition, the performance of existing Singlet Oxygen Generator (SOG) can be substantially improved upon by reducing the unobstructed free volume. This can be accomplished by baffling, torturous paths and/or contouring of the surfaces so as to increase the loss of radiation from the chambers.

The performance of a large volume supersonic COIL laser can be improved upon by the use of optical isolators to reduce and minimize the 4–12 micron radiation that is generated within the laser cavity. The safe operating size limits of large COIL devices can be extended by the use of optical isolation stages between the modules. These front surface optical isolators will reflect the 1.31 micron radiation while absorbing the 4–12 micron radiation.

The performance of supersonic HF/DF chemical lasers can be improved by control of the ambient electromagnetic environment (AERE) to minimize the H+HF deactivation reactions. The control of the AERE can be achieved by use of anti-reflecting coatings in the 2–4 micron region of the infrared spectra on the nozzle face and containment walls of the supersonic flow, by cooling of these walls and operating the supersonic flow at or below 300 K. This latter condition can be approached by operating the fluorine combustor at reduced plenum temperatures (T~1200K), using a large expansion area nozzle to achieve hypersonic velocities and very low expansion temperatures (T~100 K) of the primary flow. The hydrogen or deuterium is pre-cooled to liquid nitrogen temperatures and injected parallel to the main flow so as to minimize flow stagnation effects. This will maintain the minimum temperature conditions. Examples of the type of nozzles to be used to achieve this parallel mixing are the Aerospace axi-symmetric nozzle design or the Rocketdyne, parallel slit design. All of these techniques can be synergized through the methodology steps already enumerated.

The performance of a supersonic azide based chemical laser based upon the NCl(a)+I–NCl(X)+I* process can be improved by the use of optical coatings to mitigate the AERE in the 5.2 micron region of the infrared spectrum. This radiation is generated and required by the I*+NCl(a)→I+NCl(b) up-conversion processes which removes both NCl(a) and I* from the flow and therefore must be avoided. This laser can be optimized by following the methodology steps previously summarized.

The performance of a supersonic visible red chemical laser based upon the NCl(bX) transition can be developed and optimized by the use of optical coatings and radiation sources to enhance the AERE in the 5.2 micron region of the infrared spectrum. This radiation is generated and required by the I*+NCl(a)→I+NCl(b) up-conversion processes which is necessary to generate the NCl(b) state. This laser system, like the supersonic azide based chemical laser, can be optimized by following the above-summarized methodology steps.

The present invention is also used effectively with the family of electronic transition lasers based upon the stimulated emission process, NF(a)+X+hv→NF(x)+X*+2hvv where X=HF, DX, CO, NO and other diatomic molecules with large dipole transition radiative cross-sections. These lasers require a hypersonic flow system based upon the NF(a) reaction system previously developed by the inventor.

The foregoing descriptions and drawings should be considered as illustrative only of the principles of the invention. The invention may be implemented in a variety of systems and is not limited to the scenario of the preferred embodiment. Numerous applications of the present invention will readily occur to those skilled in the art. Therefore, it is not desired to limit the invention to the specific examples disclosed or the exact construction and operation shown and described. Rather, all suitable modifications and equivalents may be resorted to, falling within the scope of the invention.

What is claimed is:

1. A method of controlling an ambient electromagnetic radiation environment to improve performance of a gas phase chemical laser system comprising the steps of:
   applying a mathematical model to energy transfer processes of a gas phase chemical laser system in order to determine a specific dependency of each of said processes upon the ambient electromagnetic radiation environment (AERE) and kinetic temperatures;
   using said mathematical model to determine a plurality of spectral frequencies that need to be controlled for each of said energy transfer processes;
   performing analytical calculations to predict an effect of moderating the AERE at said plurality of spectral frequencies;
   monitoring said frequencies in subscale and scaled flow experiments to quantify the mathematical model predictions and analytical calculations;
   applying anti-reflective coatings, designed to reduce a reflectivity of undesired spectral ranges, to surfaces surrounding gas flow in said laser system to mitigate the AERE in said undesired spectral ranges; and
   providing radiation sources and reflective coatings to surfaces surrounding a reaction chamber of said laser system to promote kinetic processes that are beneficial to the performance of said gas phase chemical laser system.

2. The method as set forth in claim 1, wherein the step of performing analytical calculations includes scaling calculations to determine threshold conditions and optimum flow configurations and conditions to control radiation at said frequencies.

3. The method as set forth in claim 2, wherein the radiation is controlled by adjusting at least one of shape, contour and temperature of a nozzle of said laser system and surrounding hardware.

4. The method as set forth in claim 1, wherein the step of applying coatings includes using dichroic optical isolators to isolate flow component modules that are combined to construct a larger laser.

5. The method as set forth in claim 1, further comprising the step of reducing unobstructed free volume to improve performance.

6. The method as set forth in claim 5, wherein the step of reducing unobstructed free volume includes at least one of baffling, tortuous paths and contouring of laser system surfaces to increase radiation loss.

7. The method as set forth in claim 1, further comprising the steps of constructing containment walls for a Singlet Oxygen Generator (SOG) of a material with a high emissivity (low reflectivity) in a 4–12 micron spectral region and cooling said walls to minimize radiation in said spectral region.

8. The method as set forth in claim 7, further comprising the step of improving the performance of a large volume supersonic COIL laser by using optical isolators to reduce and minimize the 4–12 micron radiation that is generated within a laser cavity.

9. The method as set forth in claim 1, further comprising the steps of improving performance of a supersonic HF/DF chemical laser with supersonic flow by controlling the ambient electromagnetic environment (AERE) to minimize H+HF deactivation reactions by using anti-reflecting coatings in a 2–4 micron region of the infrared spectra on a nozzle face area and containment walls of the supersonic flow, cooling of said walls and operating the supersonic flow at or below 300 K.

10. The method as set forth in claim 9, wherein the step of operating the supersonic flow at or below 300 K is performed by operating a fluorine combustor at reduced plenum temperatures of approximately 1200K, and using a large expansion area nozzle to achieve hypersonic velocities and very low expansion temperatures of about 100K of a main flow.

11. The method as set forth in claim 10, wherein hydrogen or deuterium is pre-cooled to liquid nitrogen temperatures and injected parallel to the main flow so as to minimize flow stagnation effects.

12. The method as set forth in claim 1, further comprising the step of using optical coatings to mitigate the AERE in a 5.2 micron region of the infrared spectrum to improve the performance of a supersonic azide based chemical laser based upon a NCl(a)+I→NCl(X)+I* process.

13. The method as set forth in claim 1, further comprising the step of using optical coatings and radiation sources to enhance the AERE in a 5.2 micron region of the infrared spectrum to improve the performance of a supersonic visible red chemical laser based upon a NCl(b-X) transition.

14. The method as set forth in claim 1, using a family of electronic transition lasers based upon the stimulated emission process, NF(a)+X+hv→NF(x)+X* +2hv where X=HF, DX, CO, NO or other diatomic molecules with large dipole transition radiative cross-sections.

15. The method as set forth in claim 1, wherein the mathematical model is based on a purely optical electronic transfer reaction yields theory.

16. A method of controlling an ambient electromagnetic radiation environment to improve performance of a gas phase chemical laser system comprising the steps of:
   applying a mathematical model to energy transfer processes of a gas phase chemical laser system in order to determine a specific dependency of each of said processes upon the ambient electromagnetic radiation environment (AERE) and kinetic temperatures;
   using said mathematical model to determine a plurality of spectral frequencies that need to be controlled for each of said energy transfer processes;
   performing analytical calculations to predict an effect of moderating the AERE at said plurality of spectral frequencies;
   monitoring said frequencies in subscale and scaled flow experiments to quantify the mathematical model predictions and analytical calculations;
   reducing, based on said mathematical model predictions and analytical calculations, a reflectivity of undesired spectral ranges in surfaces of said laser system surrounding gas flow to mitigate the AERE in said undesired ranges; and
   increasing, based on said mathematical model predictions and analytical calculations, a reflectivity of desired spectral ranges in surfaces surrounding a reaction chamber of said laser system to promote kinetic processes that are beneficial to the performance of said gas phase chemical laser system.

17. The method as set forth in claim 16, wherein said step of increasing reflectivity includes providing radiation sources and applying reflective coatings to said reaction chamber surfaces.

18. The method as set forth in claim 16, wherein said step of decreasing reflectivity includes applying anti-reflective coatings to said laser system gas flow surfaces.

* * * * *